(12) United States Patent
Maheshwari et al.

(10) Patent No.: US 12,140,671 B2
(45) Date of Patent: Nov. 12, 2024

(54) VELOCITY DETERMINATION WITH A SCANNED LIDAR SYSTEM

(71) Applicant: Luminar Technologies, Inc., Orlando, FL (US)

(72) Inventors: Pranav Maheshwari, Palo Alto, CA (US); Meseret R. Gebre, Palo Alto, CA (US); Shubham C. Khilari, Palo Alto, CA (US); Vahid R. Ramezani, Los Altos, CA (US)

(73) Assignee: Luminar Technologies, Inc., Orlando, FL (US)

( * ) Notice: Subject to any disclaimer, the term of this patent is extended or adjusted under 35 U.S.C. 154(b) by 1042 days.

(21) Appl. No.: 17/065,011

(22) Filed: Oct. 7, 2020

(65) Prior Publication Data

US 2022/0107414 A1    Apr. 7, 2022

(51) Int. Cl.
| | | |
|---|---|---|
| *G01S 17/58* | (2006.01) | |
| *G01S 7/48* | (2006.01) | |
| *G01S 7/481* | (2006.01) | |
| *G01S 13/58* | (2006.01) | |
| *G01S 17/89* | (2020.01) | |
| *G06F 18/23* | (2023.01) | |
| *G06T 7/13* | (2017.01) | |

(52) U.S. Cl.
CPC ............ *G01S 17/58* (2013.01); *G01S 7/4808* (2013.01); *G01S 7/4817* (2013.01); *G01S 13/588* (2013.01); *G01S 17/89* (2013.01); *G06F 18/23* (2023.01); *G06T 7/13* (2017.01); *G06T 2207/10028* (2013.01)

(58) Field of Classification Search
CPC ...... G01S 17/58; G01S 7/4808; G01S 7/4817; G01S 17/89; G01S 13/588; G06T 7/13; G06T 2207/10028; G06F 18/23
See application file for complete search history.

(56) References Cited

U.S. PATENT DOCUMENTS

| | | | |
|---|---|---|---|
| 10,345,437 B1* | 7/2019 | Russell | ................... G01S 17/06 |
| 2008/0229127 A1* | 9/2008 | Felter | ................... G06F 1/3296 |
| | | | 713/320 |
| 2014/0064555 A1* | 3/2014 | Sebastian | .............. G01S 7/4808 |
| | | | 382/103 |
| 2018/0374346 A1 | 12/2018 | Fowe | |

(Continued)

OTHER PUBLICATIONS

International Search Report and Written Opinion for PCT/US2021/052883 dated May 30, 2022.

*Primary Examiner* — Luke D Ratcliffe
*Assistant Examiner* — Joseph C Fritchman
(74) *Attorney, Agent, or Firm* — Van Pelt, Yi & James LLP

(57) ABSTRACT

A scanning imaging sensor is configured to sense an environment through which a vehicle is moving. A method for determining one or velocities associated with objects in the environment includes generating features from the first set of scan lines and the second set of scan lines, the two sets corresponding to two instances in time. The method further includes generating a collection of candidate velocities based on feature locations and time differences, the features selected pairwise with one from the first set and another from the second set. Furthermore, the method includes analyzing the distribution of candidate velocities, for example, by identifying one or more modes from the collection of the candidate velocities.

21 Claims, 11 Drawing Sheets

(56) References Cited

U.S. PATENT DOCUMENTS

2019/0049240 A1    2/2019  Kawanishi et al.
2019/0107623 A1*   4/2019  Campbell ............. G01S 17/931
2020/0041619 A1    2/2020  Maheshwari et al.

* cited by examiner

900

First set of features

| | 821 | 822 | 823 | 824 | 825 | 826 | 827 | 828 |
|---|---|---|---|---|---|---|---|---|
| 831 | $V_{11}$ | $V_{21}$ | | | | | $V_{71}$ | $V_{81}$ |
| 832 | $V_{12}$ | $V_{22}$ | | | | | $V_{72}$ | $V_{82}$ |
| 833 | | | $V_{33}$ | $V_{43}$ | | | | |
| 834 | | | $V_{34}$ | $V_{44}$ | | | | |
| 835 | | | | | $V_{55}$ | $V_{65}$ | | |
| 836 | | | | | $V_{56}$ | $V_{66}$ | | |
| 837 | $V_{17}$ | $V_{27}$ | | | | | $V_{77}$ | $V_{87}$ |
| 838 | $V_{18}$ | $V_{28}$ | | | | | $V_{78}$ | $V_{88}$ |

Second set of features

VELOCITY DETERMINATION WITH A SCANNED LIDAR SYSTEM

FIELD OF THE DISCLOSURE

The present disclosure generally relates to imaging systems that operate according to certain scan patterns and, more particularly, to configuring such imaging systems so as to efficiently determine velocities of one or more imaged objects.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ imaging sensors, such as light detection and ranging (lidar) devices, to detect or "see" the surrounding environment as the vehicles move toward their destinations. Such vehicles include control systems that process the sensor data and, based on both the sensed environment and the desired destination, determine which maneuvers and operational parameters (e.g., speed, braking force, steering direction) are most appropriate on a more or less continuous basis throughout the trip. The autonomous vehicles seek not only to arrive at the desired destination, but also to maintain the safety of both the autonomous vehicle passengers and any individuals who may be in the general vicinity of the autonomous vehicles.

Achieving this goal is a formidable challenge, largely because an autonomous vehicle is surrounded by an environment that can rapidly change, with a wide variety of objects (e.g., other vehicles, pedestrians, stop signs, traffic lights, curbs, lane markings, etc.) potentially being present at a variety of locations/orientations, and/or moving at different velocities relative to the vehicle. An imaging system that collects and processes an entirety of a frame representing a scene or even multiple frames to calculate velocities of objects in the field of regard may have a limited response time for determining maneuvers and operational parameters. Furthermore, systems that rely on complex segmentation and object tracking algorithm may have processing delays that further limits the time in which the systems may respond to moving objects.

SUMMARY

An imaging system of this disclosure receives sensor data for the field of regard (FOR) of the imaging system. The system may use techniques described in the disclosure to implement a method for determining one or more velocities of an object based on locations of features at different instances in time. The features may be generated from two sets of scan lines, the two sets traversing an overlapping field of view.

One example embodiment of these techniques is a method of determining a velocity of an object using an imaging sensor, the method comprising determining, by one or more processors, a first set of features of the object and a second set of features of the object using data collected by the imaging sensor during a first time interval and a second time interval. The method may further comprise computing, by the one or more processors, a plurality of candidate velocities based on differences in spatial positions of features selected pairwise from the first set and the second (i.e., one from the first set and another from the second set). Still further, the method may comprise computing the velocity of the object based on the plurality of candidate velocities.

Another example embodiment of the techniques is an imaging system (e.g., a lidar system) configured to implement the method above.

DETAILED DESCRIPTION

Figure 1:
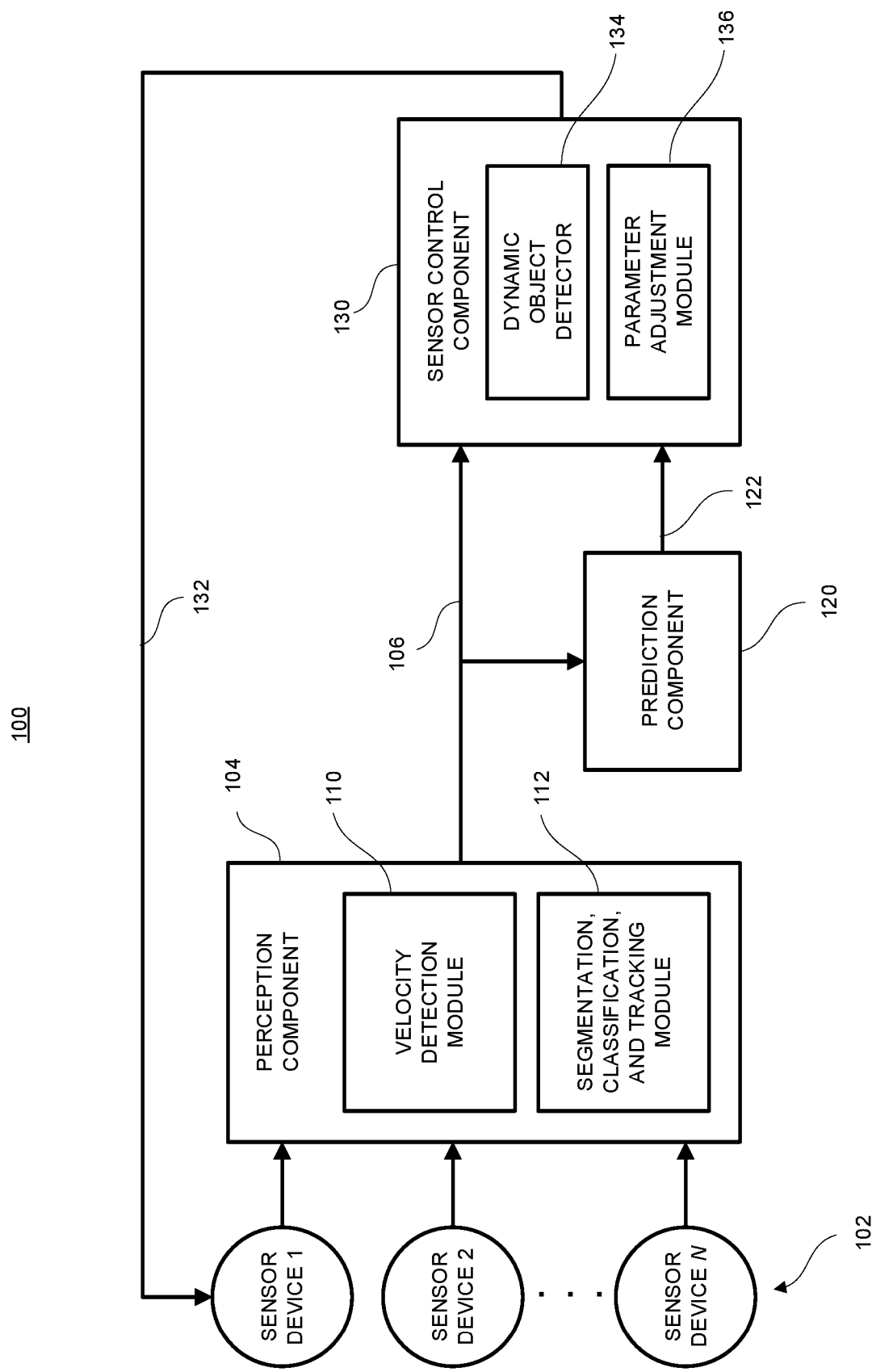
FIG. 1 is a block diagram of an example software system for controlling parameters of one or more vehicle sensors based on a velocity computed using input from one or more of the sensors.

Quickly determining the velocity of an object using the output of an imaging sensor of a vehicle can substantially improve situational awareness enabling autonomous functionality of the vehicle. The method described here includes generating two sets of features of an object corresponding to two time periods. The method includes subsequently calculating multiple candidate velocities by determining differences in positions of features selected pairwise from the first set and the second set. The method further includes determining the velocity of the object based on the distribution of the candidate velocities, as described in more detail below. The method and a system implementing the method shorten the time required to determine presence, location, and velocity of one or more moving objects and/or significantly lighten the computational load for such a determination.

According to the techniques of this disclosure, an imaging system can generate estimates of velocities of one or more objects in the environment. In some implementations, the imaging sensor of the system collects data by scanning the sensing region or a field of regard (FOR) and extracts features of one or more objects without relying on a full scan. For example, each feature of an object may be based on a set of data points that belong to a single scan line. In such implementations, a system implementing the method may obtain two sets of features corresponding to two different instances (time intervals) in the course of a single scan of the FOR (i.e., a frame). To that end, a scanning system may be configured to scan a region within the FOR with scan lines appropriately delayed with respect to each other. In other implementations, the first set of features and the second set of features may be determined on separate scans of the FOR or frames by a single sensor (or sensor head). Still in other implementations, multiple sensors or sensor heads may acquire data from an overlap of respective FORs at two separate instance and determine respective feature sets based on the respective sets of data.

The vehicle may be a fully self-driving or "autonomous" vehicle, a vehicle controlled by a human driver, or use some combination of autonomous and operator-controlled components. The disclosed techniques may be used, for example, to capture vehicle environment information to improve the safety/performance of an autonomous vehicle, to generate alerts for a human driver, or simply to collect data relating to a particular driving trip (e.g., to record how many other vehicles or pedestrians were encountered during the trip, etc.). The sensors may be any type or types of sensors capable of sensing an environment through which the vehicle is moving, such as lidar, radar, cameras, and/or other types of sensors. The vehicle may also include other sensors, such as inertial measurement units (IMUs), and/or include other types of devices that provide information on the current position of the vehicle (e.g., a GPS unit).

The sensor data (and possibly other data) is processed by a perception component of the vehicle, which outputs signals indicative of the current state of the vehicle's environment. For example, the perception component may identify positions and/or velocities of (and possibly classify and/or track) objects within the vehicle's environment. As a more specific example that utilizes lidar or radar data, the perception component may include a segmentation module that partitions lidar or radar point clouds devices into subsets of points that correspond to probable objects, a classification module that determines labels/classes for the subsets of points (segmented objects), and a tracking module that tracks segmented and/or classified objects over time (i.e., across subsequent point cloud frames). Furthermore, the techniques discussed in this disclosure allow determining, at least approximately, object velocities and location estimates without relying on segmentation.

In some implementations, the imaging system may process, or, in a sense, pre-process portions of point clouds before collecting and processing a full point cloud. For example, the imaging system may be configured to collect, within one point cloud, during two or more time intervals (or instances), two or more respective data sets corresponding to substantially the same region of space and/or FOR. The system may then pre-process, so to say, the two or more datasets to compute one or more velocities (and, in some implementation, locations) of possible objects within the region of space and/or the FOR according to the methods discussed below, particularly with reference to FIGS. 6-10.

The imaging system can adjust one or more parameters of the sensors based on various types of information and/or criteria. In some embodiments, the imaging system controls parameters that determine the area of focus of a sensor. For example, the imaging system can adjust the center and/or size of the FOR of a lidar or radar device, and/or modify the spatial distribution of scan lines (e.g., with respect to elevation angle) produced by such a device to focus on particular types of objects, particular groupings of objects, particular types of areas in the environment (e.g., the road immediately ahead of the vehicle, the horizon ahead of the vehicle, etc.), and so on. For some implementations in which scan line distributions can be controlled, the imaging system can cause the sensor to produce scan lines arranged according to a sampling of some continuous mathematical distribution, such as a Gaussian distribution with a peak scan line density that covers the desired area of focus (e.g., near a horizon), or a multimodal distribution with peak scan line densities in two or more desired areas of focus. Moreover, in some implementations and/or scenarios, the imaging system can position scan lines according to some arbitrary distribution. For example, the imaging system can position scan lines to achieve a desired resolution for each of two or more areas of the environment (e.g., resulting in a 2:4:1 ratio of scan lines covering an area of road immediately ahead of the vehicle, to scan lines covering an area that includes the horizon, to scan lines covering an area above the horizon). In some implementations, the imaging system can position scan lines to focus on one or more moving objects in response, for example, to one or more object velocities and/or positions.

In some implementations, the imaging system may traverse (e.g., acquire data or emit laser pulses) the scan lines in a spatially continuous manner, such as from top to bottom, from bottom to top, or from one side to another. In other implementations, the imaging system may hop from one region within the FOR to another, while returning to an omitted portion later, but within the same frame. Still in other implementations, the imaging system may rescan certain regions within the FOR, acquiring data from the same region or regions at different points in time, but within the same frame. The imaging system may change the one or more rescan regions in response to information (e.g., object positions and/or velocities, road configuration, etc.) obtained from processing previous frames and/or from pre-processing of the frame in progress.

Additionally or alternatively, the imaging system may vary the timing of the scan through the FOR. That is, the rate at which scan lines are traversed may vary from one frame to another and/or within a frame. The imaging system may change the scanning rates in response to information (e.g., object positions and/or velocities, road configuration, etc.) obtained from processing previous frames and/or from pre-processing of the frame in progress.

Movements of objects within an FOR and relative to a stationary frame of reference (i.e., not simply the relative motion due to the vehicle carrying the imaging system moving through the environment) are of particular importance for vehicle operation. Though multiple frames may be used to ascertain object velocities, such an approach may take longer than desired. On the other hand, quickly determining the velocity of an object directly using the output, perhaps even an incomplete frame, of an imaging sensor of a vehicle can substantially improve situational awareness and enable or improve autonomous functionality of the vehicle.

As stated above, the methods described here includes generating two sets of features of an object corresponding to two time periods. An imaging system implementing the methods may calculate multiple candidate velocities by determining differences in positions of features selected pairwise from the first set and the second set (and dividing by corresponding time differences). The system may determine the velocity of the object based on the distribution of the candidate velocities. The system may then generate signals used in operation of the motion of the vehicle, signals for adjusting the operation of the imaging system of the vehicle, and other suitable signals, for example, for communication with other vehicles and/or transportation infrastructure.

In some implementations, the imaging system determines the area of focus using a heuristic approach, as represented by various rules, algorithms, criteria, etc. For example, the imaging system can determine the area of focus based on the presence and positions of "dynamic" objects, or particular types of dynamic objects, within the environment. The presence, positions and/or types of the dynamic objects may be determined using data generated by the sensor that is being controlled, and/or using data generated by one or more other sensors on the vehicle. For example, a camera with a wide-angle view of the environment may be used to determine a narrower area of focus for a lidar device. As an alternative example, the imaging system can initially configure a lidar device to have a relatively large FOR, and later be set to focus on (e.g., center a smaller FOR upon, increase scan density around, etc.) a dynamic object detected in a specific portion of the larger FOR.

It can be advantageous to set the area of focus based on sensor data, but without relying on segmentation or classification of objects. In some implementations, the imaging system can combine heuristic algorithms operating directly on subsets of sensor data to determine an appropriate area of focus with suitable precision. For example, the system may base the area of at least in part based on distance to and/or velocity of one or more dynamic objects, the velocity determined at least in part according to the methods described in the present disclosure.

An example architecture of an imaging system configured to control a vehicle sensor in view of a determined velocity of an object is discussed next with reference to FIG. 1, followed by a discussion of example lidar systems in which the imaging system can be implemented, with reference to FIGS. 2-5. FIG. 6 illustrates an example scan pattern used to determine an object velocity and adjusting the sensor parameters (e.g., lidar scan line distributions, rescan parameters, etc.). Finally, example methods relating to determining one or more object velocities are discussed with respect to the flow diagram of FIG. 7, and subsequent accompanying FIGS. 8-10.

FIG. 1 illustrates an example architecture of an imaging system 100 that dynamically controls one or more parameters of one or more of sensors 102. The sensors 102 may be utilized by an autonomous vehicle (e.g., to make intelligent driving decisions based on the vehicle's current environment), or by a non-autonomous (or an autonomous) vehicle for other purposes (e.g., to collect data pertaining to a particular driving trip). As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As the term is used herein, a "vehicle" may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle. As seen in FIG. 1, the vehicle may include N different sensors 102, with N being any suitable integer (e.g., 1, 2, 3, 5, 10, 20, etc.). At least "Sensor 1" of the sensors 102 is configured to sense the environment of the autonomous vehicle by physically interacting with the environment in some way, such as transmitting and receiving lasers that reflect off of objects in the environment (e.g., if the sensor is a lidar device), transmitting and receiving radio or acoustic signals that reflect off of objects in the environment (e.g., if the sensor is a radar or sonar device), simply receiving light waves generated or reflected from different areas of the environment (e.g., if the sensor is a camera), and so on. Depending on the embodiment, all of the sensors 102 may be configured to sense portions of the environment, or one or more of the sensors 102 may not physically interact with the external environment (e.g., if one of the sensors 102 is an inertial measurement unit (IMU)). The sensors 102 may all be of the same type, or may include a number of different sensor types (e.g., multiple lidar devices with different viewing perspectives, and/or a combination of lidar, camera, radar, and thermal imaging devices, etc.).

The data generated by the sensors 102 may serve as input to a perception component 104 of the sensor control architecture 100, and is processed by the perception component 104 to generate perception signals 106 descriptive of a current state of the vehicle's environment. It is understood that the term "current" may actually refer to a very short time prior to the generation of any given perception signals 106, e.g., due to the short processing delay introduced by at least some portions of the perception component 104 and other factors. A separate velocity detection module 110 may generate perception signals associated with object velocity (and, possibly, position) estimations with a shorter processing delay than the more computationally intensive modules associated with object classification, for example. To generate additional perception signals 106, the perception component 104 may include a segmentation, classification, and tracking module 112. In some implementations, separate segmentation, classification, and tracking modules generate some of the perception signals 106.

The velocity detection module 110 may determine the velocity of at least one object within the FOR according to methods described in this disclosure. Generally, a method of determining a velocity of an object may include determining at least two sets of features of the object using data collected by one of the sensors 102 during the corresponding time intervals. The two time intervals, for example, may correspond to the times associated with two frames of an imaging sensor. Thus, the two data sets may be at least parts of frame data from separate frames. Alternatively, the two data sets may originate from the same frame of a sensor. To that end, a scanning sensor may include a rescan region.

The velocity determination module 110 may compute, by one or more processors, a number (10 to 1,000,000 or more) of candidate velocities based on differences in spatial positions of features selected pairwise from the first and the second datasets. Subsequently, the velocity determination module 110 may compute the velocity of the object (or multiple object velocities) based on the distribution of the plurality of candidate velocities. The details of the methods employed by the velocity determination module 110 are described below, particularly with reference to FIG. 7-10.

The sensor control architecture 100 also includes a prediction component 120, which processes the perception signals 106 to generate prediction signals 122 descriptive of one or more predicted future states of the vehicle's environment. For a given object, for example, the prediction component 120 may analyze the type/class of the object along with the recent tracked movement of the object (as determined by the segmentation, classification, and tracking module 112) to predict one or more future positions of the object. As a relatively simple example, the prediction component 120 may assume that any moving objects will continue to travel with no change to their current direction and speed, possibly taking into account first- or higher-order derivatives to better track objects that have continuously changing directions, objects that are accelerating, and so on. Additionally or alternatively, the prediction component 120 may predict the perception signals associated with horizon estimations or other areas of interest within the FOR to adjust scan parameters to facilitate or improve the performance of the velocity detection module 110. Furthermore, the prediction module 120 may verify or improve the accuracy of the one or more velocities computed by the velocity detection module 120. Still further, the prediction component 120 may use past values generated by the velocity detection module 110 (e.g., using low pass, median, Kalman, or any other suitable filtering) and/or past values generated by the segmentation, classification, and tracking module 112.

The perception signals 106 and (in some embodiments) prediction signals 122 are input to a sensor control component 130, which processes the signals 106, 122 to generate sensor control signals 132 that control one or more parameters of at least one of the sensors 102 (including at least a parameter of "Sensor 1"). In particular, the sensor control component 130 attempts to direct the focus of one or more of the sensors 102 based on detected movement (e.g., using modules 110 and 112 of the perception component 104) or determination of a horizon. It should be noted that, in some implementations, determination of a horizon is at least in part based on the detected movement. The parameter adjustment module 136 determines the setting for parameter(s) of the controlled sensor(s) (among sensors 102). In some implementations, the setting for parameter(s) may be based on the one or more detected object velocities. In particular, the parameter adjustment module 136 determines values of one or more parameters that set the area of focus and, in some implementations, scan rates and patterns of the controlled scanning sensor(s). Generally, the controlled parameter(s) is/are parameters that affect which area/portion of the vehicle environment is sensed by a particular sensor and how the sensing is implemented. For example, the parameter adjustment module 136 may determine values that set the horizontal and/or vertical FOR of the controlled sensor(s) (e.g., the range of azimuthal and/or elevation angles covered by the FOR), the center of the FOR (e.g., by mechanically moving the entire sensor, or adjusting mirrors that move the center of the FOR), the spatial distribution of scan lines produced by the sensor(s), and/or the time sequence in which the sensor acquires the scan lines. Example scan line distributions and acquisition sequences are discussed in more detail below, with reference to FIGS. 7 and 8. As discussed, the controlled sensor parameter(s) may affect not only the area of focus for a sensor, but also the manner in which a given area of the vehicle environment is sensed. For example, the parameter adjustment module 136 may control the frame/refresh rate of the sensor, the spatial resolution (e.g., number of points per point cloud frame), the time resolution (with rescanned FOR portions within one frame) of the sensor, and so on.

As seen from various examples provided above, sensor data collected by a vehicle may, in some embodiments, include point cloud data that is generated by one or more lidar devices or, more generally, a lidar system. To provide a better understanding of the types of data that may be generated by lidar systems, and of the manner in which lidar systems and devices may function, example lidar systems and an example point cloud are described with reference to FIGS. 2-5.

Figure 2:
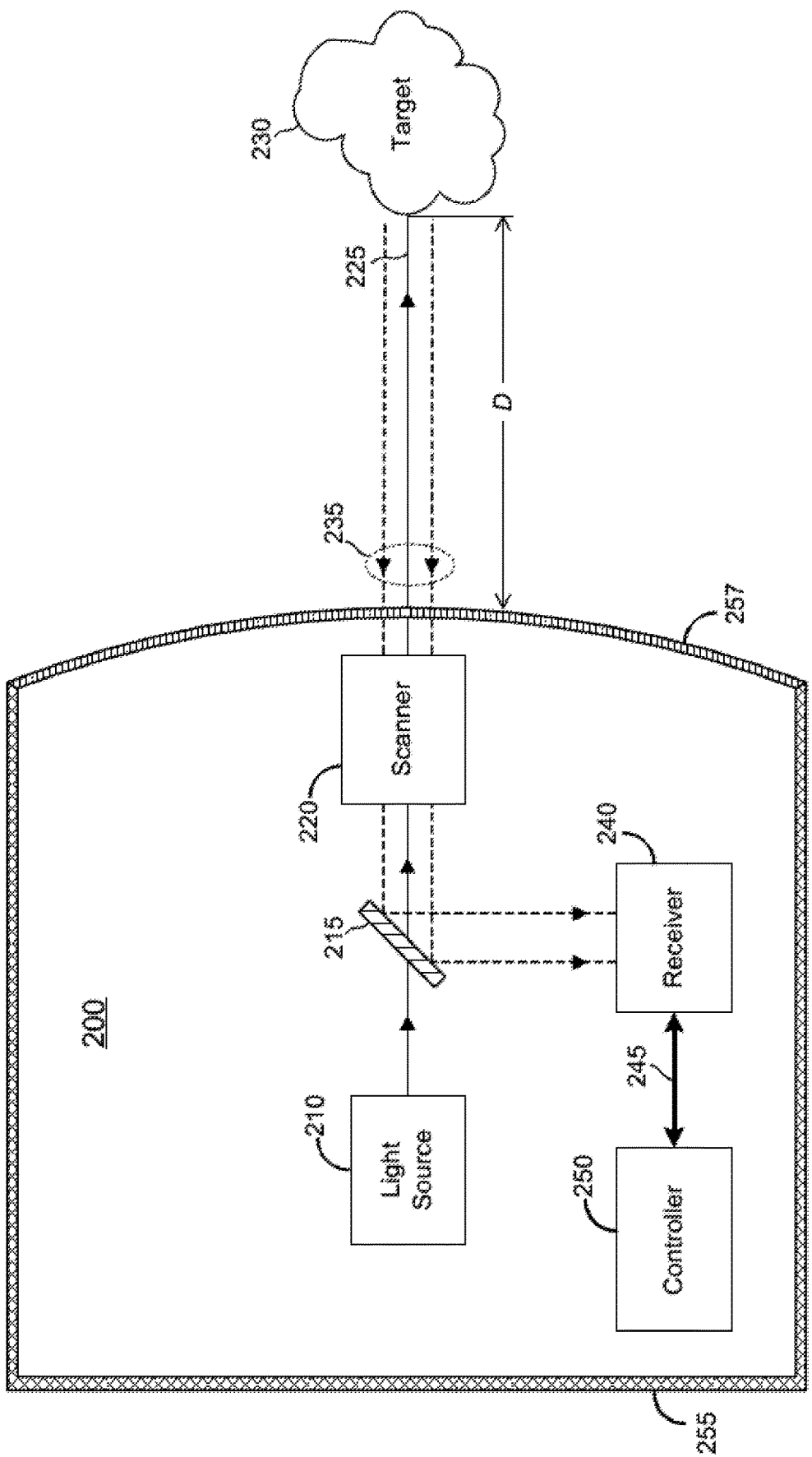
FIG. 2 is a block diagram of an example light detection and ranging (lidar) system that may be controlled using the sensor control architecture of FIG. 1.

FIG. 2 illustrates a lidar system 200. The lidar system 200 can operate as at least one of the sensors 102 of FIG. 1, for example. While various lidar system components and characteristics are described herein, it is understood that any suitable lidar device(s) or system(s), and/or any other suitable types of sensors, may provide sensor data for processing using the software architectures described herein. Furthermore, an example multi-sensor lidar system, operating using the principles described with respect to the lidar system 200, is described with reference to FIGS. 4A,B.

The example lidar system 200 may include a light source 210, a mirror 215, a scanner 220, a receiver 240, and a controller 250. The light source 210 may be, for example, a laser (e.g., a laser diode) that emits light having a particular operating wavelength in the infrared, visible, or ultraviolet portions of the electromagnetic spectrum. In operation, the light source 210 emits an output beam of light 225 which may be continuous-wave, pulsed, or modulated in any suitable manner for a given application. The output beam of light 225 is directed downrange toward a remote target 230 located a distance D from the lidar system 200 and at least partially contained within an FOR of the system 200.

Once the output beam 225 reaches the downrange target 230, the target 230 may scatter or, in some cases, reflect at least a portion of light from the output beam 225, and some of the scattered or reflected light may return toward the lidar system 200. In the example of FIG. 2, the scattered or reflected light is represented by input beam 235, which passes through the scanner 220, which may be referred to as a beam scanner, optical scanner, or laser scanner. The input beam 235 passes through the scanner 220 to the mirror 215, which may be referred to as an overlap mirror, superposition mirror, beam-splitter mirror, or beam-combiner mirror. The mirror 215 in turn directs the input beam 235 to the receiver 240.

The input beam 235 may include light from the output beam 225 that is scattered by the target 230, light from the output beam 225 that is reflected by the target 230, or a combination of scattered and reflected light from target 230. According to some implementations, the lidar system 200 can include an "eye-safe" laser that present little or no possibility of causing damage to a person's eyes. The input beam 235 may contain only a relatively small fraction of the light from the output beam 225.

The receiver 240 may receive or detect photons from the input beam 235 and generate one or more representative signals. For example, the receiver 240 may generate an output electrical signal 245 that is representative of the input beam 235. The receiver may send the electrical signal 245 to the controller 250. Depending on the implementation, the controller 250 may include one or more instruction-executing processors, an application-specific integrated circuit (ASIC), a field-programmable gate array (FPGA), and/or other suitable circuitry configured to analyze one or more characteristics of the electrical signal 245 in order to determine one or more characteristics of the target 230, such as its distance downrange from the lidar system 200. More particularly, the controller 250 may analyze the time of flight or phase modulation for the beam of light 225 transmitted by the light source 210. If the lidar system 200 measures a time of flight of T (e.g., T representing a round-trip time of flight for an emitted pulse of light to travel from the lidar system 200 to the target 230 and back to the lidar system 200), then the distance D from the target 230 to the lidar system 200 may be expressed as D=c·T/2, where c is the speed of light (approximately $3.0 \times 10^8$ m/s).

The distance D from the lidar system 200 is less than or equal to a maximum range $R_{MAX}$ of the lidar system 200. The maximum range $R_{MAX}$ (which also may be referred to as a maximum distance) of a lidar system 200 may correspond to the maximum distance over which the lidar system 200 is configured to sense or identify targets that appear in an FOR of the lidar system 200. The maximum range of lidar system 200 may be any suitable distance, such as 50 m, 200 m, 500 m, or 1 km, for example.

In some implementations, the light source 210, the scanner 220, and the receiver 240 may be packaged together within a single housing 255, which may be a box, case, or enclosure that holds or contains all or part of the lidar system 200. The housing 255 includes a window 257 through which the beams 225 and 235 pass. The controller 250 may reside within the same housing 255 as the components 210, 220, and 240, or the controller 250 may reside outside of the housing 255. In one embodiment, for example, the controller 250 may instead reside within, or partially within, the perception component 104 of the sensor control architecture 100 shown in FIG. 1. In some implementations, the housing 255 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

With continued reference to FIG. 2, the output beam 225 and input beam 235 may be substantially coaxial. In other words, the output beam 225 and input beam 235 may at least partially overlap or share a common propagation axis, so that the input beam 235 and the output beam 225 travel along substantially the same optical path (albeit in opposite directions). As the lidar system 200 scans the output beam 225 across an FOR, the input beam 235 may follow along with the output beam 225, so that the coaxial relationship between the two beams is maintained.

Generally speaking, the scanner 220 steers the output beam 225 in one or more directions downrange. To accomplish this, the scanner 220 may include one or more scanning mirrors and one or more actuators driving the mirrors to rotate, tilt, pivot, or move the mirrors in an angular manner about one or more axes, for example. While FIG. 2 depicts only a single mirror 215, the lidar system 200 may include any suitable number of flat or curved mirrors (e.g., concave, convex, or parabolic mirrors) to steer or focus the output beam 225 or the input beam 235. For example, the first mirror of the scanner may scan the output beam 225 along a first direction, and the second mirror may scan the output beam 225 along a second direction that is substantially orthogonal to the first direction.

An FOR of the lidar system 200, as discussed above, may refer to an area, region, or angular range over which the lidar system 200 may be configured to scan or capture distance information. When the lidar system 200 scans the output beam 225 within a 30-degree scanning range, for example, the lidar system 200 may be referred to as having a 30-degree angular FOR. The scanner 220 may be configured to scan the output beam 225 horizontally and vertically, and the FOR of the lidar system 200 may have a particular angular width along the horizontal direction and another particular angular width along the vertical direction. For example, the lidar system 200 may have a horizontal FOR of 10° to 120° (or up to 360° with a multisensory system) and a vertical FOR of 2° to 45°.

The one or more scanning mirrors of the scanner 220 may be communicatively coupled to the controller 250, which may control the scanning mirror(s) so as to guide the output beam 225 in a desired direction downrange or along a desired scan pattern. In general, a scan (or scan line) pattern may refer to a pattern or path along which the output beam 225 is directed. The lidar system 200 can use the scan pattern to generate a point cloud with points or "pixels" that substantially cover the FOR. The pixels may be approximately evenly distributed across the FOR, or distributed according to a particular non-uniform distribution.

In operation, the light source 210 may emit pulses of light which the scanner 220 scans across an FOR of the lidar system 200. The target 230 may scatter or reflect one or more of the emitted pulses, and the receiver 240 may detect at least a portion of the pulses of light scattered or reflected by the target 230. The receiver 240 may receive or detect at least a portion of the input beam 235 and produce an electrical signal that corresponds to the input beam 235. The controller 250 may be electrically coupled or otherwise communicatively coupled to one or more of the light source 210, the scanner 220, and the receiver 240. The controller 250 may provide instructions, a control signal, or a trigger signal to the light source 210 indicating when the light source 210 should produce optical pulses, and possibly characteristics (e.g., duration, period, peak power, wavelength, etc.) of the pulses. The controller 250 may also determine a time-of-flight value for an optical pulse based on timing information associated with when the pulse was emitted by light source 210 and when a portion of the pulse (e.g., the input beam 235) was detected or received by the receiver 240.

As indicated above, the lidar system 200 may be used to determine the distance to one or more downrange targets 230. By scanning the lidar system 200 across an FOR, the system can be used to map the distance to a number of points within the FOR. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the FOR. For example, a depth map may cover an FOR that extends 60° horizontally and 15° vertically, and the depth map may include a frame of 100-2000 pixels in the horizontal direction by 4-400 pixels in the vertical direction.

The lidar system 200 may be configured to repeatedly capture or generate point clouds of an FOR at any suitable frame rate between approximately 0.1 frames per second (FPS) and approximately 1,000 FPS, for example. The point cloud frame rate may be substantially fixed or dynamically adjustable, depending on the implementation. In general, the lidar system 200 can use a slower frame rate (e.g., 1 Hz) to capture one or more high-resolution point clouds, and use a faster frame rate (e.g., 20 Hz) to rapidly capture multiple lower-resolution point clouds.

The FOR of the lidar system 200 can overlap, encompass, or enclose at least a portion of the target 230, which may include all or part of an object that is moving or stationary relative to lidar system 200 or to the static environment. For example, the target 230 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 3:
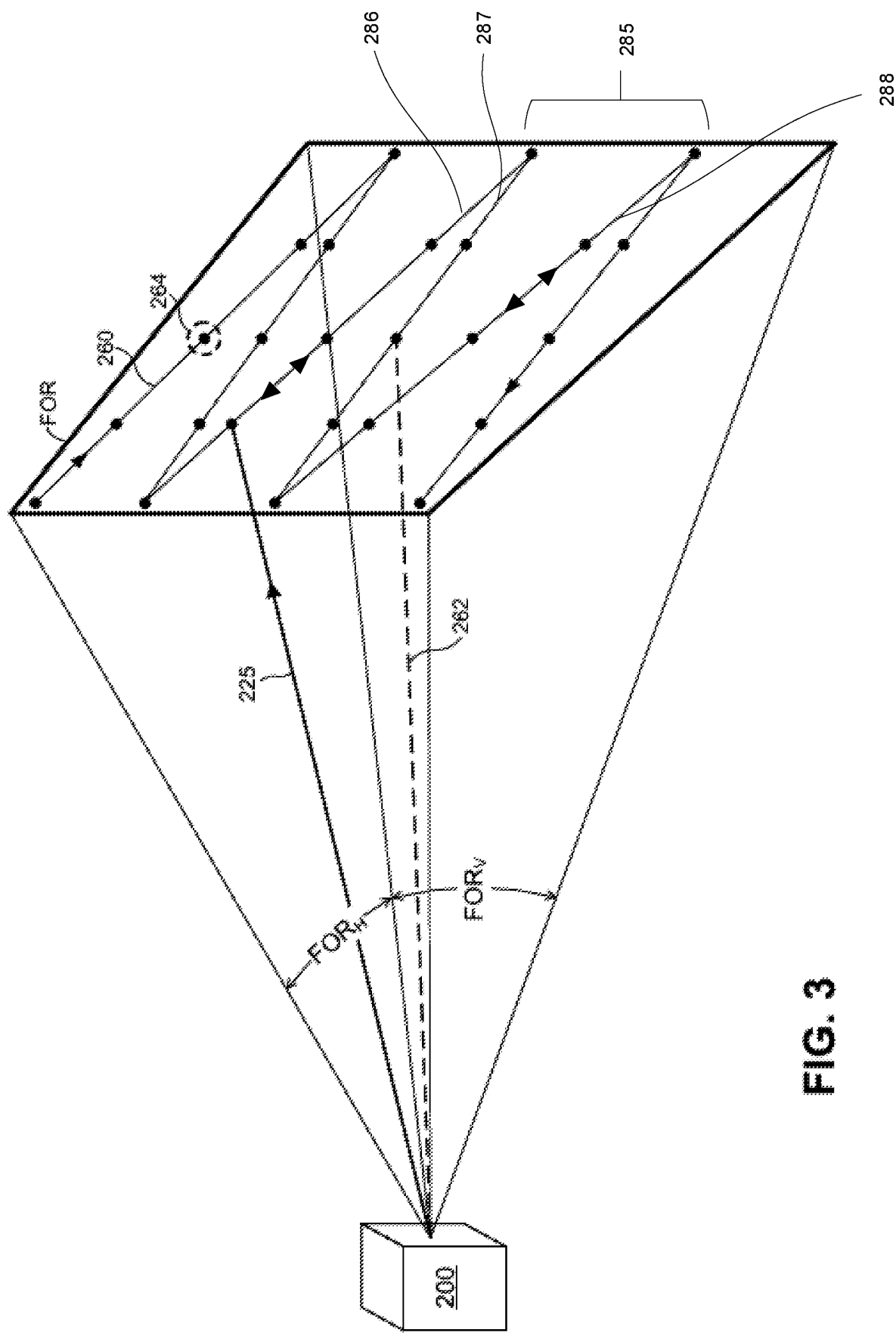
FIG. 3 illustrates an example scan pattern with a rescan region which the lidar system of FIG. 2 may produce when identifying targets and/or computing one or more object velocities within a field of regard.

FIG. 3 illustrates an example scan pattern 260 which the lidar system 200 of FIG. 2 may produce. In particular, the lidar system 200 may be configured to scan the output optical beam 225 along the scan pattern 260. In some implementations, the scan pattern 260 corresponds to a scan across any suitable FOR having any suitable horizontal FOR ($FOR_H$) and any suitable vertical FOR ($FOR_V$). For example, a certain scan pattern may have an FOR represented by angular dimensions (e.g., $FOR_H \times FOR_V$) 40°×30°, 90°×40°, or 60°×15°. While FIG. 3 depicts a "zig-zag" pattern 260, other implementations may instead employ other patterns (e.g., parallel, horizontal scan lines), and/or other patterns may be employed in specific circumstances. Although the scan pattern 260 in FIG. 3 includes six scan lines, the number of lines may be any suitable number, such as tens or hundreds of scan lines.

In the example implementation and/or scenario of FIG. 3, reference line 262 represents a center of the FOR of scan pattern 260. In FIG. 3, if the scan pattern 260 has a 60°×15° FOR, then the scan pattern 260 covers a ±30° horizontal range with respect to reference line 262 and a ±7.5° vertical range with respect to reference line 262. An azimuth (which may be referred to as an azimuth angle) may represent a horizontal angle with respect to the reference line 262, and an altitude (which may be referred to as an altitude angle, elevation, or elevation angle) may represent a vertical angle with respect to the reference line 262.

The scan pattern 260 may include multiple points or pixels 264, and each pixel 264 may be associated with one or more laser pulses and one or more corresponding distance measurements. A cycle of scan pattern 260 may include a total of $P_x \times P_y$ pixels 264 (e.g., a two-dimensional distribution of $P_x$ by $P_y$ pixels). The number of pixels 264 along a horizontal direction may be referred to as a horizontal resolution of the scan pattern 260, and the number of pixels 264 along a vertical direction may be referred to as a vertical resolution of the scan pattern 260.

Each pixel 264 may be associated with a distance/depth (e.g., a distance to a portion of a target 230 from which the corresponding laser pulse was scattered) and one or more angular values. As an example, the pixel 264 may be associated with a distance value and two angular values (e.g., an azimuth and altitude) that represent the angular location of the pixel 264 with respect to the lidar system 200. A distance to a portion of the target 230 may be determined based at least in part on a time-of-flight measurement for a corresponding pulse. More generally, each point or pixel 264 may be associated with one or more parameter values in addition to its two angular values. For example, each point or pixel 264 may be associated with a depth (distance) value, an intensity value as measured from the received light pulse, and/or one or more other parameter values, in addition to the angular values of that point or pixel.

An angular value (e.g., an azimuth or altitude) may correspond to an angle (e.g., relative to reference line 262) of the output beam 225 (e.g., when a corresponding pulse is emitted from lidar system 200) or an angle of the input beam 235 (e.g., when an input signal is received by lidar system 200). In some implementations, the lidar system 200 determines an angular value based at least in part on a position of a component of the scanner 220. For example, an azimuth or altitude value associated with the pixel 264 may be determined from an angular position of one or more corresponding scanning mirrors of the scanner 220. The zero elevation, zero azimuth direction corresponding to the reference line 262 may be referred to as a neutral look direction (or neutral direction of regard) of the lidar system 200.

In some implementations, a light source of a lidar system is located remotely from some of the other components of the lidar system such as the scanner and the receiver. Moreover, a lidar system implemented in a vehicle may include fewer light sources than scanners and receivers.

A rescan region 285 may include scan lines 286-288 that may be traversed two or more times by the sensor 200 during the course of a single scan of the FOR. In some implementations, the scan lines 286-288 may be scanned in a reverse direction during the second pass vis-à-vis the first pass. Subsequently, the scan lines 286-288 may be scanned for the third time, in the same direction as the first pass. Generally, the scan lines of the rescan region may be traversed any suitable number of times, and with suitable delays that may depend on motor slew rates and mirror geometries of the scanner 220. Further, the scan lines 268-288 of the rescan region 285 need not acquire data from the same azimuths and elevations on the second (and/or third, etc.) path as on the first pass through the rescan region 285. Still further, the first pass and any subsequent passes (or the same scan) through the rescan region 285 need not follow the same scan lines (i.e., azimuth and elevation positions of the instantaneous look directions). The multiple passes through the rescan region 285 may aid in generating a first set of scan lines and a second (as well as, possibly, a third, and so on) set of scan lines that the velocity detection module 110 may use to compute the velocity of at least one object within the rescan region 285.

Figure 4A:
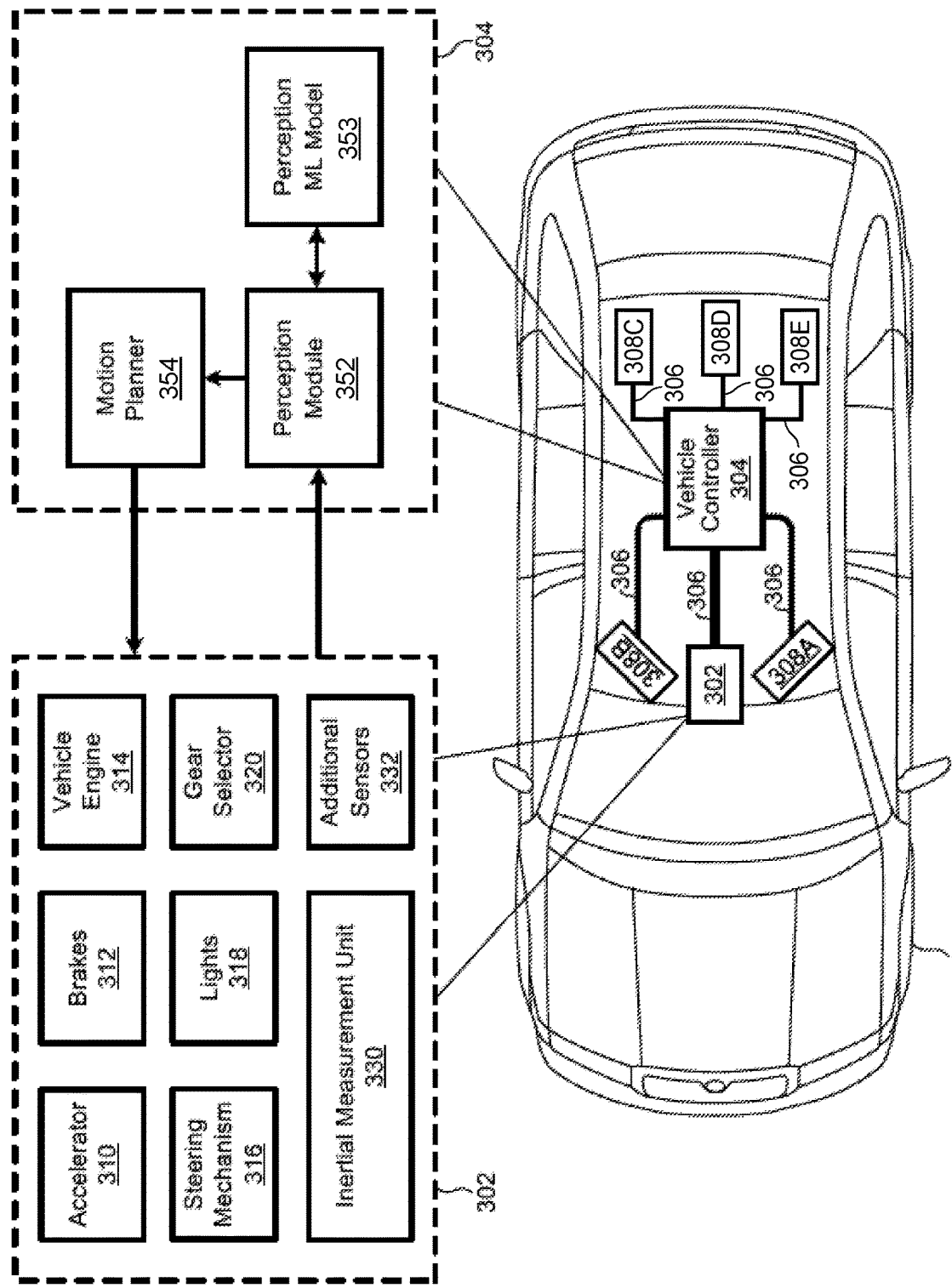
FIG. 4A illustrates an example vehicle in which the lidar system of FIG. 2 may operate.
Figure 4B:
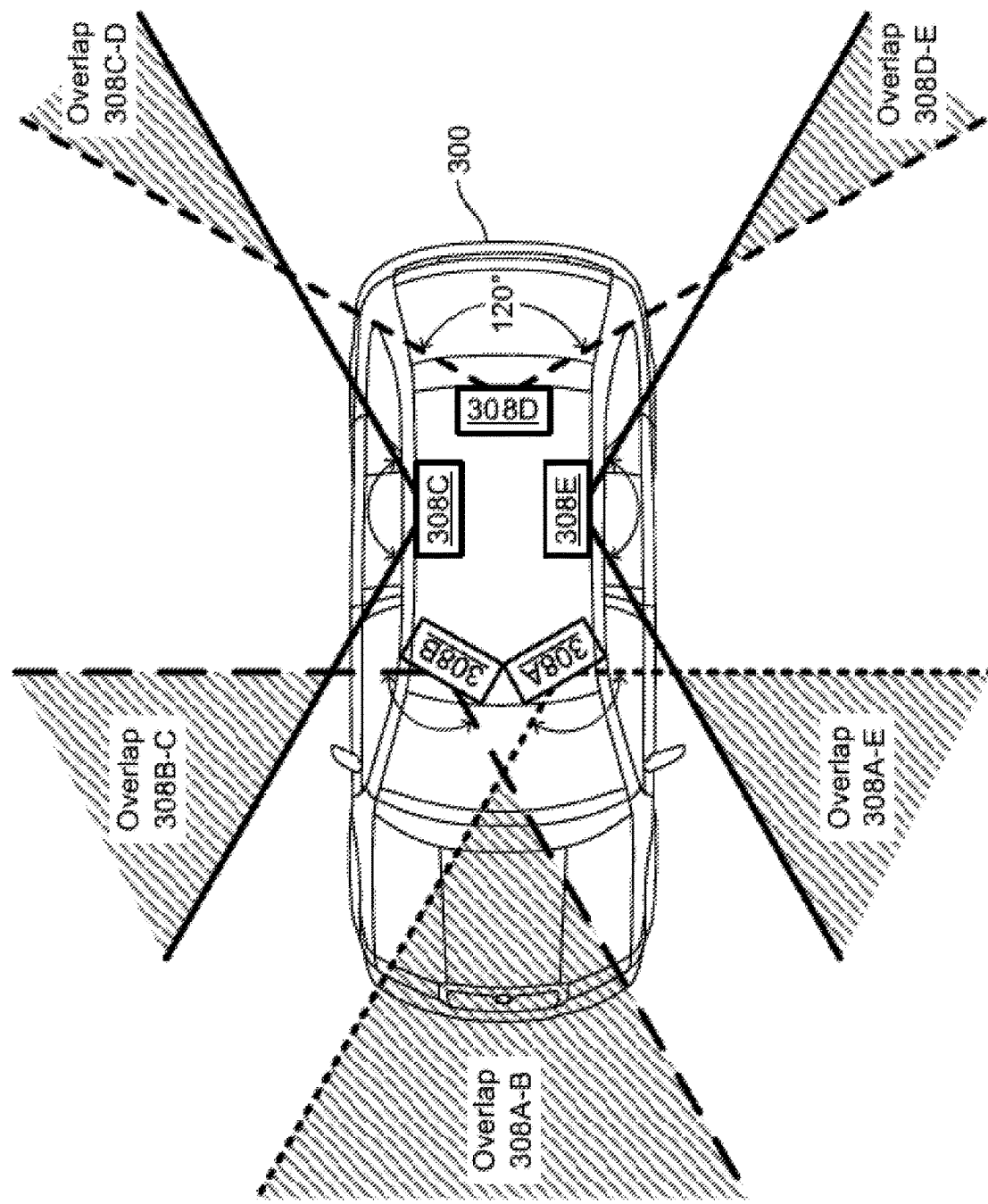
FIG. 4B illustrates an example of imaging overlap among sensor heads of the lidar system operating in the example vehicle of FIG. 4A.

FIGS. 4A and 4B illustrate an example autonomous vehicle 300 in which a controller 304 can operate various components 302 for maneuvering and otherwise control operation of the vehicle 300. These components are depicted in an expanded view in FIG. 4A for clarity. The perception component 104, the prediction component 120, and the sensor control component 130, illustrated in FIG. 1, can be implemented in the vehicle controller 304 of FIG. 4A.

The components 302 can include an accelerator 310, brakes 312, a vehicle engine 314, a steering mechanism 316, lights 318 such as brake lights, head lights, reverse lights, emergency lights, etc., a gear selector 320, and/or other suitable components that effectuate and control movement of the vehicle 300. The gear selector 320 may include the park, reverse, neutral, drive gears, etc. Each of the components 302 may include an interface via which the component receives commands from the vehicle controller 304 such as "increase speed," "decrease speed," "turn left 5 degrees," "activate left turn signal," etc. and, in some cases, provides feedback to the vehicle controller 304.

The autonomous vehicle 300 can be equipped with a lidar system including a laser and multiple sensor heads 308A-E coupled to the controller via sensor links 306. Each of the sensor heads 308 may include a light source and a receiver, for example, and each of the sensor links 306 may include one or more optical links and/or one or more electrical links. The sensor heads 308 in FIG. 4A are positioned or oriented to provide a greater than 30-degree view of an environment around the vehicle. More generally, a lidar system with multiple sensor heads may provide a horizontal FOR around a vehicle of approximately 30°, 45°, 60°, 90°, 120°, 180°, 270°, or 360°. Each of the sensor heads 308 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 4A, five sensor heads 308 are positioned on the vehicle (e.g., each of the sensor heads 308 may be incorporated into a light assembly, side panel, bumper, or fender) at positions providing different fields of view for the sensor heads 308, and the laser may be located within the vehicle 300 (e.g., in or near the trunk). As illustrated in FIG. 4B, the five sensor heads 308 may each provide a 120° horizontal FOR (FOR), and the five sensor heads 308 may be oriented so that together they provide a complete 360-degree view around the vehicle. As another example, the lidar system 302 may include six sensor heads 308 positioned on or around the vehicle 300, where each of the sensor heads 308 provides a 60° to 90° horizontal FOR. As another example, the lidar system may include eight sensor heads 308, and each of the sensor heads 308 may provide a 45° to 60° horizontal FOR. As yet another example, the lidar system may include six sensor heads 308, where each of the sensor heads 308 provides a 70° horizontal FOR with an overlap between adjacent sensor heads 308 of approximately 10°. As another example, the lidar system may include two sensor heads 308 which together provide a forward-facing horizontal FOR of greater than or equal to 30°.

In the embodiment illustrated in FIG. 4B, the sensor heads 308 each have an FOR of 120° which provides overlap between the FORs of the sensor heads 308A-E. For example, the sensor heads 308A and 308B have an FOR overlap of approximate 60° due to the position and relative angular configuration of the sensor heads 308A and 308B. Similarly, the overlaps of the FORs for sensor heads 308B and 308c, and for sensor heads 308A and 308E have approximately 60° of overlap. Due to the uneven spatial distribution and arrangement of the FORs of the sensor heads 308A-E, the overlap of the FORs for sensor heads 308C and 308D, and sensor heads 308D and 308E have a smaller overlap of approximately 30°. In some embodiments, the overlap of the FORs of the sensors may be configured to be any desired overlap dependent on the number of sensor heads 308, and the spatial and angular arrangement of the sensor heads.

Data from each of the sensor heads 308 may be combined or stitched together to generate a point cloud that covers a less than or equal to 360-degree horizontal view around a vehicle. For example, the lidar system may include a controller or processor that receives data from each of the sensor heads 308 (e.g., via a corresponding electrical link 306) and processes the received data to construct a point cloud covering a 360-degree horizontal view around a vehicle or to determine distances to one or more targets. The point cloud or information from the point cloud may be provided to a vehicle controller 304 via a corresponding electrical, optical, or radio link 306. The vehicle controller 304 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 308 at a controller included within the lidar system, and is provided to the vehicle controller 304. In other implementations, each of the sensor heads 308 includes a controller or processor that constructs a point cloud for a portion of the 360-degree horizontal view around the vehicle and provides the respective point cloud to the vehicle controller 304. The vehicle controller 304 then combines or stitches together the points clouds from the respective sensor heads 308A-E to construct a combined point cloud covering a 360-degree horizontal view. Still further, the vehicle controller 304 in some implementations communicates with a remote server to process point cloud data.

In some implementations, the vehicle controller 304 receives point cloud data from the sensor heads 308 via the links 306 and analyzes the received point cloud data, using any one or more of the aggregate or individual SDCAs disclosed herein, to sense or identify targets and their respective locations, distances, speeds, shapes, sizes, type of target (e.g., vehicle, human, tree, animal), etc. The vehicle controller 304 then provides control signals via the links 306 to the components 302 to control operation of the vehicle based on the analyzed information.

In addition to the lidar system, the vehicle 300 may also be equipped with an inertial measurement unit (IMU) 330 and other sensors 332 such a camera, a thermal imager, a conventional radar (none illustrated to avoid clutter), etc. The other sensors 332 may each have respective FORs that may be stitched together to generate 360-degree horizontal views around the vehicle. In embodiments, the data from the other sensors 332 may be combined with the data from the sensor heads 308 to generate data sets to enable autonomous operation of the vehicle 300. The sensors 330 and 332 can provide additional data to the vehicle controller 304 via wired or wireless communication links. Further, the vehicle 300 in an example implementation may include a microphone array operating as a part of an acoustic source localization system configured to determine sources of sounds.

As illustrated in FIG. 4A, the vehicle controller 304 can include a perception module 352 and a motion planner 354, each of which can be implemented using hardware, firmware, software, or any suitable combination of hardware, firmware, and software. In relation to the components in FIG. 1, the perception component 104 may be included in the perception module 352, while the prediction component 120 and the sensor control component 130 may be integrated into the motion planner 354, for example. In operation, the perception module 352 can receive sensor data from the sensors 330, 332, 308A-E, etc. and apply the received sensor data to a perception model 353 to generate parameters of the environment in which the autonomous vehicle 300 operates, such as curvature of the road, presence of obstacles, distance to obstacles, etc. The perception module 352 then can supply these generated parameters to the motion planner 354, which in turn generates decision for controlling the autonomous vehicle 300 and provides corresponding commands to the accelerator 310, the brakes 312, the vehicle engine 314, the steering mechanism 316, etc.

The perception module 352 may include the velocity detection module 110. The velocity detection module may advantageously use the overlap between pairs of sensor heads 308A-E. For example, a pair of sensor heads 308A-E may be configured to collect data from an overlapping region with a suitable time difference. The time difference may be smaller (e.g., ½, ⅕, ¹⁄₁₀, ¹⁄₂₀, etc.) than the time for obtaining a full scan of the FOR (i.e., a frame) by either one of the sensor heads 308A,B. In this manner, the sensor head 308A may obtain a set of data from the overlap region of sensor heads 308A,B at one time, while the sensor head 308B may obtain another set of data from the overlap region of sensor heads 308A,B at another time. The velocity detection module 110 may generate one set of features based on the set of data from the sensor head 308A, and another set of features from the set of data from the sensor head 308B. Subsequently, without processing the whole point cloud, the velocity detection module 110 may compute the velocities of one or more objects, as discussed in this disclosure. Notably, the sensor heads 308A-E may be arranges so as to have continuous coverage over a suitable azimuthal span using pairwise overlap regions. That is, for example, where the overlap between sensor heads 308A,B ends, the overlap between sensors heads 308B,C may begin.

In some implementations, the velocity detection module 110 may generate features based on the output of the perception model 353. That is, the perception model 353 may include a component that may help identify features of moving objects from partial point clouds or even, groups of points from a single scan line. In some implementation, the perception model 353, or more generally, the prediction component 120 of FIG. 1 may generate predicted features based on data from previous frames. The velocity detection module 110 may then identify the features and the corresponding locations at least in part by correlating scan data with the predicted features.

The motion planner 354 may utilize any suitable type(s) of rules, algorithms, heuristic models, machine learning models, or other suitable techniques to make driving decisions based on the output of the perception module 352, which utilizes the perception model 353 as discussed above. For example, in some implementations, the motion planner 354 is configured with corresponding algorithms to make particular decisions for controlling the autonomous vehicle 300 in response to specific signals or combination of signals. As another example, in some embodiments, a machine learning model for the motion planner 354 may be trained using descriptions of environmental parameters of the type the perception model 353 generates. In additional embodiments, virtual data may be used to train a machine learning model of motion planner 354. For example, the motion planner 354 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on. In any case, a training platform can train the motion planning model separately and independently of the perception module 352.

The output of the motion planner 354 may be used by the vehicle controller 304 (e.g., the velocity detection module 110, the prediction component 120, the perception module 352, and/or the perception model 353) to predict object features and/or their locations. For example, if the vehicle 300 is turning, the controller 304 may predict, using suitable geometric transformations, the effect on the features generated by the velocity detection module 110. The velocity detection module 110 may, in turn, compare the predicted features and their locations with the newly generated features (e.g., by correlation with the predicted features and/or other algorithms) to compute one or more object velocities.

Figure 5A:
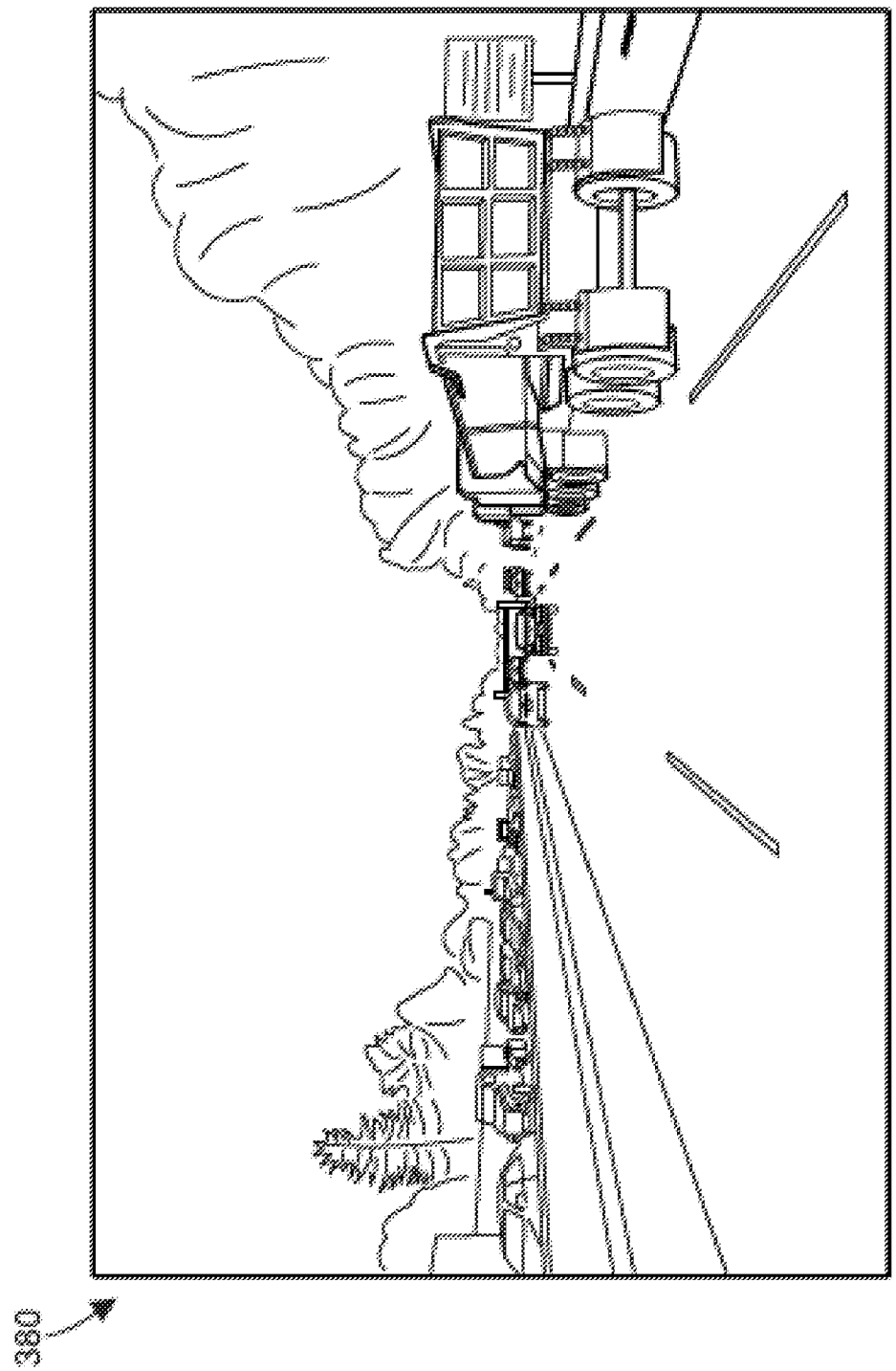
FIG. 5A illustrates an example environment in the direction of travel of an autonomous vehicle.
Figure 5B:
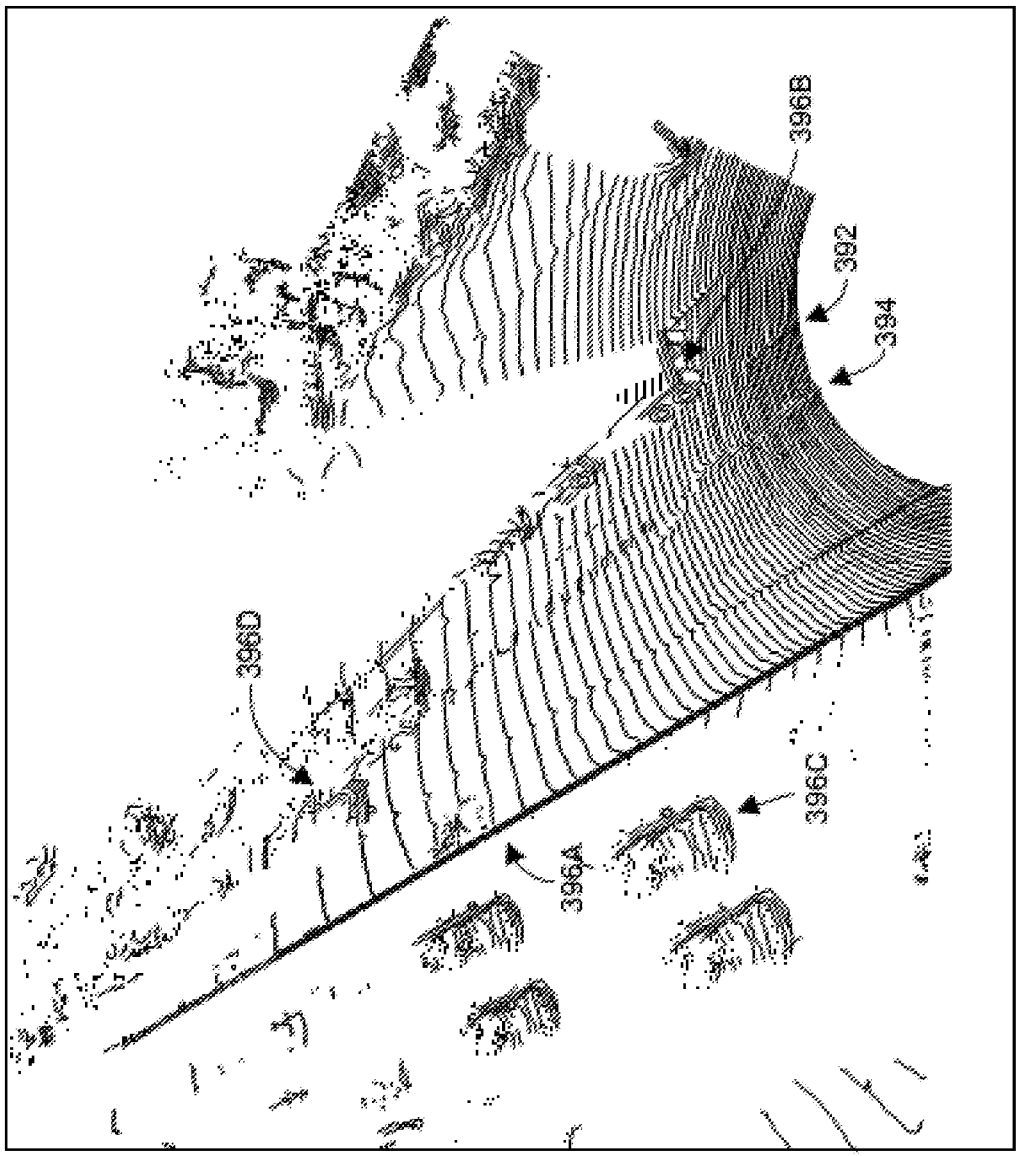
FIG. 5B illustrates an example point cloud that may be generated for the environment of FIG. 5A.
Figure 6:
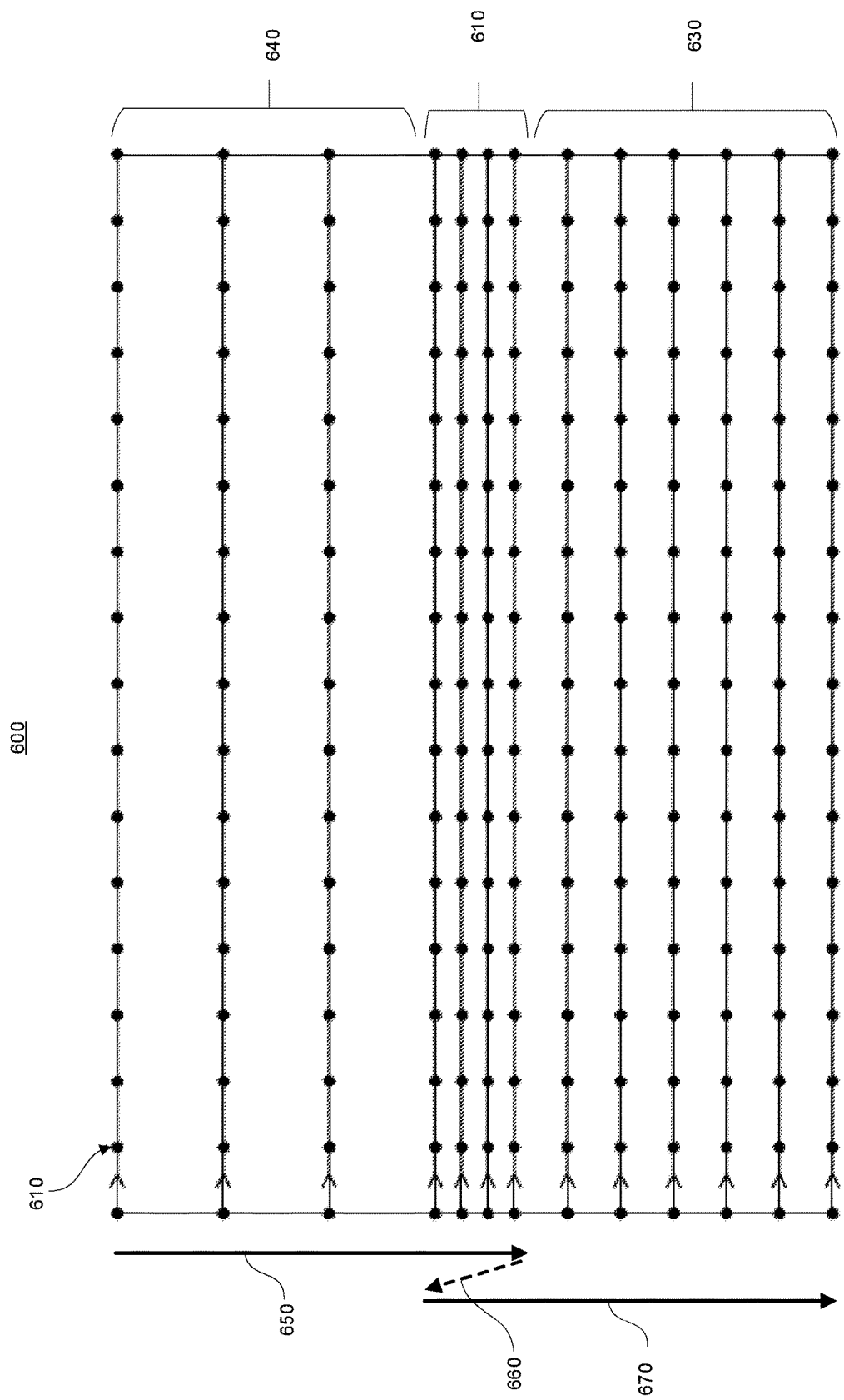
FIG. 6 illustrates another example scan pattern with a rescan region.

FIG. 5A depicts an example real-world driving environment 380, and FIG. 5B depicts an example point cloud 390 that is generated by a lidar system scanning the environment 380 (e.g., the lidar system 200 of FIGS. 2 and 3 or the lidar system of FIG. 4A). As seen in FIG. 5A, the environment 380 includes a highway with a median wall that divides the two directions of traffic, with multiple lanes in each direction.

The point cloud 390 of FIG. 5B corresponds to an example embodiment in which two lidar devices each capture a roughly 60 degree horizontal FOR, and in which the two fields of regard have a small overlap 392 (e.g., two or three degrees of overlap). The point cloud 390 may have been generated using the sensor heads 308A and 308B of FIGS. 4A,B, for example. The point cloud 390, though merging data from more than one sensor head (e.g., sensor heads 308A and 308B) may assign to each point a range, an azimuth, and an elevation, with respect to a common origin point and reference look direction. In some implementations, as discussed above, the overlap may be substantial (e.g., 30-90°), to allow two sets of data corresponding to the same object, but at slightly different times (e.g., a fraction of a full frame scan). The common origin may be designated as the average position and neutral look direction of the multiple sensor heads, or any other convenient point and/or look direction. While depicted as a visual image in FIG. 5B, it is understood that, in some embodiments, the point cloud 390 need not actually be rendered or displayed via a user interface.

As illustrated in FIG. 5B, the point cloud 390 depicts a ground plane 394 (here, the road surface) as a number of substantially continuous scan lines and also depicts, above the ground plane 394, a number of objects 396A-D. Referring back to FIG. 1, the imaging system 100 can identify some or all of the objects 396A-D within the point cloud 390 using segmentation, classification, and tracking techniques. For example, the segmentation, classification, and tracking module 112 may detect substantial gaps and/or other discontinuities in the scan lines of the ground plane 394, and identify groups of points in the vicinity of those discontinuities as discrete objects. The segmentation, classification, and tracking module 112 may determine which points belong to the same object using any suitable rules, algorithms or models. Once the objects 396A-D are identified, the segmentation, classification, and tracking module 112 of FIG. 1 may attempt to classify and/or to track the objects across future point clouds similar to the point cloud 390 (i.e., across multiple point cloud frames).

The velocity detection module 110 may cooperate with the segmentation, classification, and tracking module 112 to compute object velocities. In some implementations, however, the velocity detection module 110 may compute estimates of one or more object velocities without relying on processing the point cloud by the segmentation, classification, and tracking module 112. The velocity detection module 110 may use algorithms that operate on a subset of the point cloud data and/or are of comparatively lower complexity vis-à-vis the algorithms used by the segmentation, classification, and tracking module 112 or the dynamic object detector 134. Thus, the velocity detection module 110 may determine object velocities faster than the segmentation, classification, and tracking module 112 or the dynamic object detector 134. Consequently, the velocity detection module 110 may give the parameter adjustment module 136 and/or the motion planner 354 additional time to adjust sensor parameters or vehicle movement in response to moving objects.

In some implementations, the velocity detection module 110 may determine a first set of features and a second set of features based on a first set of scan lines of a lidar system and a second set of scan lines of a lidar system (e.g., the lidar system 200). The velocity detection module 110 may use the first set of scan lines captured when the lidar traverses an FOR in a first instance; and the second set of scan lines captured when the lidar traverses the FOR in a second instance immediately following the first instance. In some implementations, the same sensor head of the lidar may acquire the first and the second set of scan lines in consecutive frames. The consecutive frames may be acquired by scans in the same direction or scans in different (e.g., opposite) directions. For example, the lidar may scan consecutive frames in opposing elevation and/or opposing azimuthal directions. In other implementations, the same sensor head, rescanning at least a portion of the FOR within a single frame, may acquire the first and the second set of scan lines from the same frame. The rescanning of the overlap portion of the FOR may be in the same direction of the scan and/or in the opposite elevation and/or azimuthal directions. In either case, the frame may include a scan of a first portion of the FOR and a second portion of the FOR, overlapping the first portion. The first and the second set of scan lines may be from the overlap or rescan region. Additionally or alternatively, the first and the second set of lines may be from an overlap region of FORs of two separate sensor heads.

The objects 396A-D (i.e., points associated with the objects) in FIG. 5B illustrate a variety of features that the velocity detection module 110 may generate from the data. For example, a discontinuity of positions of points in a scan line may indicate an edge of an object. On the other hand, a discontinuity of slope of points in a scan line may indicate a corner of an object. In some implementations, a maximum curvature in the scan line, particularly if over a certain curvature threshold, may likewise indicate a corner of an object. Still another type of feature may be a flat surface of an object, detected as a center of a line segment formed by consecutive points in a scan line. The velocity detection module 110 may generate a set of features along with corresponding indications of feature types (e.g., corners, edges, flat surfaces).

FIG. 6 illustrates an example scan pattern 600, with an example point 610 indicating azimuth and elevation angles of an instantaneous look direction at a time when a lidar sensor (e.g., lidar 200, sensor heads 308A-E, etc.) emits laser pulse. A similar scan pattern may be used by other scanning imaging sensors. The scan pattern 600 may be adjusted by the parameter adjustment module 136 in response to the environment of the vehicle, as detected by the perception component 104, including the velocity detection module 110 or any other suitable module. The scan pattern 600 includes three regions that may be designated as a horizon region 620, a road region 630, and a sky region 640. The horizon region 620, with the largest scan line density with respect to elevation (i.e., smallest elevation difference between successive scan lines) may correspond to a focus area of the lidar. The road region 630 may have a lower scan line density than the horizon region 620, but higher than the sky region 640. A variety of other scan line densities are possible, including uniform, gradually changing with one or multiple line density maxima, or piecewise combinations thereof.

A scan pattern (e.g., scan pattern 600) of a frame may include two portions corresponding to two sub-frames, each sub-frame subtending a corresponding portion of an FOR. The two portions of the scan pattern may define three regions. The first region may include only scan lines scanning the first portion of the FOR and corresponding to the first sub-frame. The third region may include only scan lines scanning the second portion of the FOR and corresponding to the second sub-frame. The second region may include some scan lines scanning the first portion of the FOR and some scan lines scanning the second portion of the FOR that overlaps with the first portion of the FOR. Thus, the second region may be thought of as the overlap region of the FOR covered by a portion of the first sub-frame and a portion of the second sub-frame.

In FIG. 6, the first sub-frame may include an initial portion 650 of the full frame scan. A transitional portion 660 of the full frame scan may redirect a look direction of the lidar, so as to allow another portion 670 of the scan to overlap the initial portion 650. In some implementations, the lidar system may redirect the look direction by reversing an actuation direction of a motor controlling a mirror of a scanner (e.g., the scanner 220). In other implementations, a mirror of the scanner may have a shape that redirects the look direction of the lidar as the motor continues scanning in one direction.

In some implementations, the lidar system may be configured not to acquire scan lines during the transitional portion 660 of the scan. In other implementations, the lidar system may be configured to acquire additional scan lines during the transitional portion 660 of the scan. Furthermore, the lidar system may scan any portion or set of portions of an aggregate FOR any suitable number of times and in any suitable directions to acquire pairs of scan line sets covering shared regions or portions of the aggregate FOR.

Generally, any two sets of scan lines traversing corresponding FORs (each a portion of the aggregate FOR), may traverse an overlap portion of the corresponding FORs. The first set of the scan lines may traverse the corresponding FOR and, consequently, the overlap portion of the FORs at the first instance. The second set of the scan lines may traverse the corresponding FOR and, consequently, the overlap portion of the FORs at the second instance immediately following (e.g., in less time than it takes to scan the full FOR and generate a frame) the first instance. The first set of scan lines and the second set of scan lines may traverse corresponding FORs (or portions of the aggregate FOR) in the same direction or in opposite directions. More generally, each set of scan lines may traverse the corresponding at least a portion of the FOR in any suitable direction. The lidar system may acquire some scan lines by scanning from top to bottom of an FOR portion, from bottom to top, from left to right, from right to left, etc.

The parameter adjustment module 136 may configure a scan pattern, rescan portions, and/or the timing of the scan to facilitate acquiring suitable data for the velocity detection module 110. Conversely, the parameter adjustment module 136 may configure the scan at least in part in response to the velocities computed by the velocity detection module 110. For example, detecting moving objects by the velocity detection module 110 may aid in determining an elevation of horizon, and, subsequently, the horizon region of the scan.

Figure 7:
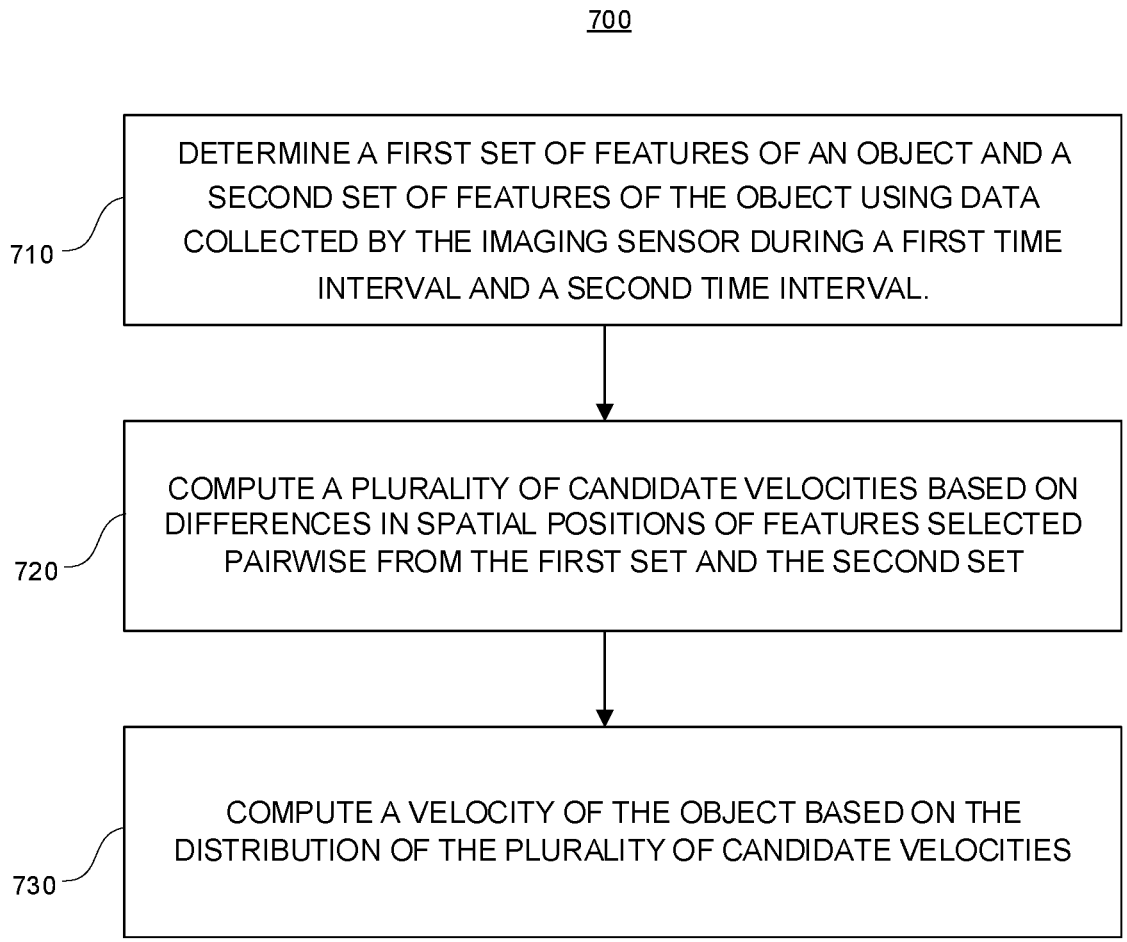
FIG. 7 is a flow diagram of an example method for computing the velocity of an object.

FIG. 7 illustrates an example method 700 of determining a velocity of an object using a lidar system (e.g., the lidar 200). Notably, the method may be used with a different type scanning imaging sensor (e.g., passive optical, thermal, or radar). Although any one or more processors of the lidar system may execute a set of instructions implementing the method 700, a dedicated velocity detection module (e.g., the velocity detection module 110) may be configured to implement the method 700.

At block 710, the method 700 may include determining a first set of features of the object and a second set of features of the object using data collected by the lidar system (or another imaging sensor) during a first time interval and a second time interval, respectively. The first set of features and the second set of features may be based on a first set of scan lines of the imaging sensor and a second set of scan lines of the imaging sensor. The lidar system may acquire the first set of scan lines and the second set of scan lines as discussed above, particularly with reference to FIG. 6. Generally, the first set of scan lines may be captured when the imaging sensor traverses an FOR in a first instance, and the second set of scan lines may be captured when the imaging sensor traverses the FOR in a second instance immediately following the first instance. As discussed above, during the first and the second instances, the lidar system may traverse at least a portion of the FOR in opposite directions or in the same direction, according to the scanning (and rescanning) pattern. In any case, the first set of scan lines may correspond or belong to a first portion of an FOR of the imaging sensor, and the second set of scan lines may correspond or belong to a second portion of the FOR partially overlapping the first portion of the FOR.

Figure 8:
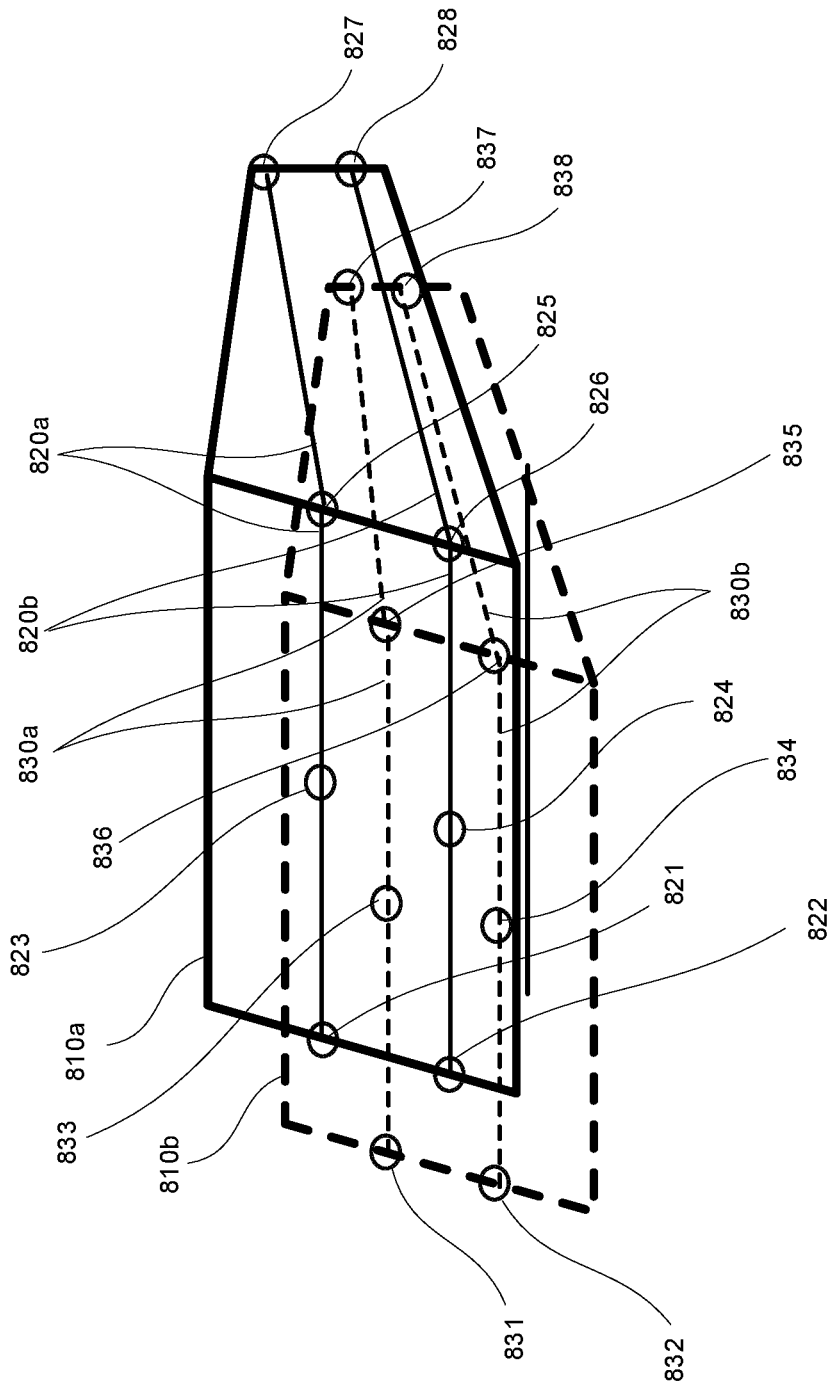
FIG. 8 illustrates example features that an imaging system may generate for the purpose of computing the velocity of an object.

The block 710 of the method 700 may be understood in the context of FIG. 8. FIG. 8 illustrates possible features that the lidar system may determine at block 710 of the method 700. At the first instance, the lidar system may detect a moving object 810*a* at one (i.e., first) location and detect a moving object 810*b* at another (i.e., second) location, where the object 810*a* and the object 810*b* may be the same object that moved from the first location to the second location in the time interval between the first instance and the second instance. It may be noted that the first instance and the second instance may be suitable time period that may be shorter than the time period corresponding to acquiring the full frame.

Laser pulses associated with portions of scan lines 820*a* and 820*b* (i.e., the first set of scan lines) impinge on the object 810*a* at the first instance, and portions of scan lines 830*a* and 830*b* (i.e., the second set of scan lines) impinge on the object 810*b* at the second instance. The portions of the scan lines 820*a,b* and 830*a,b* each include corresponding sets of points where each point has a corresponding position detected by the lidar system. In some implementations, the detected positions may be in the reference frame of the lidar system. In other implementations, the detected positions may be in the reference frame of the static environment around the lidar system or any other suitable frame of reference. That is, the lidar system may track and compensate for the movements of the lidar system.

The lidar system may extract or generate one (i.e., first) set of features 821-828 based on the first set of scan lines 820*a,b* and another (i.e., second) set of features 831-838 based on the second set of scan lines 830*a,b*. The first and the second set of features may be any two sets of features based on data acquired at two different instances with a suitable interval between the instances.

The lidar system may generate a feature by detecting a discontinuity of positions of points in a scan line to identify an edge of an object. The lidar system may label thus detected features as edge features. Numerous edge features can be seen in the example of FIG. 5B. In FIG. 8, the lidar system may generate edge features 821, 822, 827, and 828 based on the first set of scan lines 820*a,b*. Based on the second set of lines 830*a,b*, the lidar system may generate edge features 831, 832, 837, and 838.

The lidar system may generate a feature by detecting a discontinuity of slope of points in a scan line to identify an edge of an object. The lidar system may label thus detected features as corner features. A number of corner features can be seen in the example of FIG. 5B. In FIG. 8, the lidar system may generate corner features 825 and 826 based on the first set of scan lines 820*a,b*. The points in the scan lines 820*a,b* to the left of the features 825 and 826 have one slope and the points to the right of the features 825 and 826 have a different slope. Based on the second set of lines 830*a,b*, the lidar system may generate corner features 835 and 836. The points in the scan lines 830*a,b* to the left of the features 835 and 836 have one slope and the points to the right of the features 835 and 836 have a different slope.

The lidar system may generate a feature by detecting a center (e.g., by computing a centroid) of a line segment formed by consecutive points in a scan line to identify a flat surface of an object. The lidar system may label thus detected features as flat surface features. A number of flat surface features can be seen in the example of FIG. 5B. In FIG. 8, the lidar system may generate flat surface features 823 and 824 based on the first set of scan lines 820*a,b*. Based on the second set of lines 830*a,b*, the lidar system may generate flat surface features 833 and 834.

As described above, the lidar system may determine the type of a detected feature based on the algorithm or procedure of generating the corresponding feature. Sorting features by type may simplify determining velocity, as discussed below. For each generated feature, the lidar system may record the set (e.g., first, second, etc.) to which the feature belongs, the position of the feature, and the type of the feature. Additionally, the lidar system may compute a time associated with each feature. Since the first time instance and the second time instance may refer to corresponding time intervals of suitable length, each generated feature may have a corresponding time stamp having precision higher than the time duration of the first or second instance associated with the scan lines.

Returning to FIG. 7, the method 700 includes, at block 720, computing a plurality of candidate velocities based on differences in spatial positions of features selected pairwise from the first set and the second of features. In some implementations, the lidar system may compute a velocity corresponding to each pair of features with one feature from the first set and another from the second set. The computation of velocities corresponding to pairs of features may be considered in the context of FIG. 9.

Figures 9, 10:
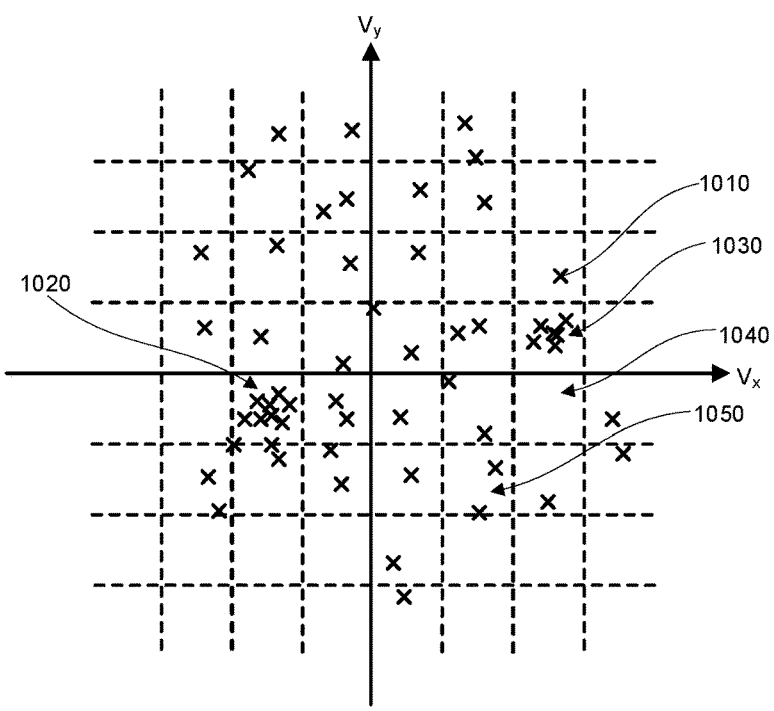
FIG. 9 is an example table of candidate velocities computed based on the features of FIG. 8.
FIG. 10 illustrates a scatter plot of candidate velocities used for computing the velocity of an objects.

FIG. 9 is a table 900 for illustrating the part of the method 700 (block 720) which includes identifying candidate velocities. Each candidate velocity may be a vector with components in x-, y-, and/or z-directions, or in any other suitable coordinate system. The method need not rely on determining correspondences between the features of the same type in the first set 821-828 and the second set 831-838. Instead, in some implementations, the method may include pairing every feature in the first set 821-828 with every feature in the second set 831-838 and computing a candidate velocity corresponding to each pair. The lidar system may compute a candidate velocity for a pair of features by subtracting the positions of the features and dividing the difference in positions by the difference in times corresponding to the features. In some implementations, positions of features in the first set or in the second set may be interpolated or otherwise transformed before computing velocities.

In the implementations where each feature is assigned a type, the system may use the pairs of features of the same type to determine candidate velocities, while ignoring the pairs of features of different types, as indicated by crosses in the table 900. Features 821, 822, 827, and 828 of the first set, for example, may be edge features that may pair with the edge features 831, 832, 837, and 838 of the second set. With the example feature sets labeled in FIG. 8, the lidar system may form sixteen pairs of edge features and compute corresponding velocities. Analogously, flat surface features 823 and 824 may form four pairs with the surface features 833 and 834, and corner features 825 and 826 may form four pairs with the corner features 835 and 836. For each pair, the lidar system may compute a corresponding velocity.

Thus, in some implementations, eight features in the first set and eight features in the second set may produce up to 64 candidate velocities. In other implementations, with pairwise calculations restricted to similar features may substantially reduce the number of candidate velocities. In the case of the table 900, 24 candidate velocities may be computed. More generally, if the first and the second set of features each include N features, and M feature types are designated, the number of candidate velocities may range from $N^2/M$ (with an equal distribution of features among the feature types) to $N^2$. In a given set, there may be 10, 20, 50, 100, 200, 500, 1000, 2000, or any other suitable number of features (including numbers between the ones in the list). Furthermore, it should be noted, that the feature numbers in the first and the second sets may be different, and a corresponding table need not form a square matrix.

To simplify the illustration in FIG. 9, the candidate velocities in the diagonal elements of the table are based on substantially corresponding pairs of features (i.e., features representing substantially the same location or point on the object 810a,b) at two different times. Thus, the candidate velocities along the diagonal may differ largely due to measurement noise. Generally, the number of features in two sets may be different. Candidate velocities for corresponding or nearly corresponding pairs of features may not lie along the diagonal of a table representing pairs of features. Nevertheless, with a sufficient number of object features, at least some are likely to be corresponding pairs. Wherever they may lie in the table, the candidate velocities computed based on corresponding pairs of features of an object (e.g., 810a,b) are substantially similar in value, provided the object does not rotate substantially. On the other hand, candidate velocities that are based on pairs of features representing substantially different points on the object are likely to be more widely distributed in values. The lidar system may estimate one or more object velocities by analyzing candidate velocity distributions, as discussed in more detail below.

Returning to FIG. 7, at block 730, the method 700 may include computing one or more object velocities (e.g., the velocity of the object 810a,b between two instances) based on a distribution of a plurality of candidate velocities (e.g., the candidate velocities in table 900). The computation of an object velocity based on a distribution of candidate velocities may be discussed in the context of FIG. 10.

FIG. 10 illustrates a distribution of x- and y-components of candidate velocities as a scatter plot 1000. In some implementations, a third component may be a part of the analysis. In other implementations, the z-component may be omitted. In any case, limiting to two velocity components simplifies the illustration. An example candidate velocity 1010 may be based on a comparison between two features, possibly of the same type (e.g., features 828 and 831 in FIG. 8). Clusters 1020 and 1030 of candidate velocities may be based on pairs of corresponding features (features associated with substantially the same points on an object), such as the candidate velocities in the diagonal elements of the table 900 of FIG. 9.

Computing the velocity of an object (e.g., object 810a,b) may include identifying a mode in the distribution of candidate velocities. For a continuous distribution, determining the mode may refer to estimating a local maximum in a distribution function modeling the obtained data. In the example of FIG. 10, identifying the mode of the distribution of the candidate velocities may include identifying a velocity representing the cluster 1020. The lidar system may identify another mode with a velocity representing the cluster 1030.

In some implementations, determining the mode may include binning the candidate velocities, each bin corresponding to a respective range of candidate velocities. In FIG. 10, the bins are delineated by dashed lines. Determining a mode may further include determining how many of the plurality of candidate velocities belong to each of a multiplicity of bins. For example, zero candidate velocities belong to bin 1040, while two candidate velocities belong to bin 1050. The majority of velocities in the cluster 1020 belong to the same bin. Likewise, the majority of velocities in the cluster 1030 belong to another bin.

In some implementations, determining the mode or multiple modes may include selecting from the multiplicity of bins a subset of one or more bins to which more than a threshold number of candidate velocities belong. For example, if the threshold is four velocities in a bin, the subset of bins may include the bins including clusters 1020 and 1030. The threshold may be based at least in part on the maximum number of candidate velocities in any one bin. For example, the lidar system may set the threshold to a fraction (e.g., 0.3, 0.5, 0.7, etc.) of the maximum bin count. Determining the mode may include determining the velocity of the object using the selected subset of bins. When only one bin in the multiplicity of bins has a count of candidate velocities above the threshold number, the method may include computing the velocity of the object by averaging the candidate velocities within the one bin. The average may be weighted, for example, to favor the velocities towards the center of the cluster. In some scenarios, a cluster of candidate velocities may occupy (i.e., belong to, in part) multiple bins. In such scenarios, when two or more adjacent bins in the multiplicity of bins have counts above the threshold, the method may include computing the velocity of the object by averaging the candidate velocities within the two or more adjacent bins. As discussed above, the average may be weighted.

In some implementations, the method of determining the mode does not need to include the binning process. For example, determining the mode in the distribution of the candidate velocities may comprise clustering the candidate velocities using one or more clustering algorithms. In other implementations, one or more modes may be found by analyzing (e.g., looking for minima) in a distribution of candidate velocities. Additionally or alternatively, a regridding process involving a convolution with a continuous kernel and resampling on a grid may produce a discrete estimate of the distribution function for further analysis.

In some implementations or scenarios, the candidate velocity distribution may include a plurality of modes. The system implementing the method may then determine whether the plurality of modes are associated with features of a single object or multiple objects. In the former case, the system may compute a linear velocity of the object and a rotational velocity of the object using the plurality of modes. More specifically, the lidar system may identify a first mode and a second mode in the distribution of candidate velocities and compute the velocity (i.e., linear velocity) and a rotational velocity of the object based at least in part on the identified first and second modes. The system may compute the linear velocity by averaging the two velocity modes associated with the same object and compute the rotational velocity as a difference between the two velocity modes divided by an estimated separation distance between the features associated with the two velocity modes.

In some scenarios, multiple candidate velocity modes may be associated with distinct objects. Thus, the system implementing the method 700 may identify the first and the second mode in the distribution of the candidate velocities and determine, in response to the first and second mode differing by greater than a particular threshold amount, that the modes correspond to two separate objects. Additionally or alternatively, distinguishing objects may be based at least in part on the one or more distances between the features associated with the first and the second velocity modes. For example, the method 700 may include identifying a first mode and a second mode in the distribution of the candidate velocities, and determining, in response to the first and second mode differing by greater than a particular threshold amount, that an object includes two separate objects.

A system for implementing the methods described above may be configured to have a suitable time difference between a first time interval and a second time interval so as to facilitate an accurate determination of object velocity. Specifically, when the time difference between the first time interval and the second time interval is too small, the spatial shift between a pair of features in the first set and the second set that correspond to a substantially similar portion of the object may be too small to accurately determine velocity. For example, if measurement uncertainty in position is 1 cm, and a shift in position between two corresponding features is 2 cm, the resulting candidate velocity estimate may be inaccurate. Increasing the time difference between the two time intervals by a factor of 10, for example, may increase the position shift to 20 cm, considerably higher than uncertainty and leading to more accurate velocity estimates. On the other hand, when a position shift is too large (e.g., 2, 5, 10, 20 m), depending of the position of the object within the FOR), a change of perspective of the imaging sensor onto the object may reduce a number of corresponding features and, consequently, decrease accuracy in estimating velocity.

In some implementations with a scanning imaging sensor, the system may be configured to have a scan pattern for obtaining the first set and the second set of features with a suitable time difference, as described above. For example, a scan of a lidar system may be configured to scan a portion of the FOR in a downward raster and then redirect a beam upward and rescan a previously scanned portion before finishing scanning the remainder of the FOR. In a sense, a portion of the FOR may be scanned twice (or more) in what may be referred to as a single frame. The system may be configures to perform the FOR scan with an overlap region using motor control, adjustments in scanning mirror shape, or a suitable combination of techniques. Alternatively, the FOR may be scanned in a uniform direction in each frame, and the frame rate may be adjusted so as to improve the accuracy of determining velocity of an object. In any case, the system may adjust the scan patterns to control the time difference between the first set of features and the second set of features used in velocity determinations.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A method of determining a velocity of an object using an imaging sensor, the method comprising:
    generating, by one or more processors, a first set of features of the object and a second set of features of the object using data collected by the imaging sensor during a first time interval and a second time interval, respectively, wherein generating a feature in the first set or second set of features includes detecting a center of a line segment formed by consecutive points in a scan line to identify a flat surface of the object;
    computing, by the one or more processors, a plurality of candidate velocities based on differences in spatial positions of features selected pairwise from the first set and the second set; and
    computing, by the one or more processors, the velocity of the object based on the distribution of the plurality of candidate velocities.

2. The method of claim 1, wherein generating the first set of features and the second set of features is based on a first set of scan lines of the imaging sensor and a second set of scan lines of the imaging sensor.

3. The method of claim 2, wherein the imaging sensor is a lidar sensor.

4. The method of claim 2, wherein:
    the first set of scan lines is captured when the imaging sensor traverses a field of regard in a first instance; and
    the second set of scan lines is captured when the imaging sensor traverses the field of regard in a second instance immediately following the first instance.

5. The method of claim 4, wherein in the first and second instances the imaging sensor traverses the field of regard in opposite directions.

6. The method of claim 2, wherein:
the first set of scan lines corresponds to a first portion of a field of regard of the imaging sensor; and
the second set of scan lines belongs to a second portion of the field of regard partially overlapping the first portion of the field of regard.

7. The method of claim 1, wherein generating a feature in the first set or second set of features further includes:
detecting a discontinuity of positions of points in the scan line to identify an edge of the object.

8. The method of claim 1, wherein generating a feature in the first set or second set of features further includes:
detecting a discontinuity of slope of points in the scan line to identify a corner of the object.

9. The method of claim 1, wherein:
generating the first set of features and the second set of features further includes determining a type of each of the features; and
computing the plurality of the candidate velocities includes restricting the pairwise comparisons to the features of the same type.

10. The method of claim 1, wherein computing the velocity of the object includes:
determining a mode in the distribution of the plurality of candidate velocities.

11. The method of claim 10, wherein determining the mode in the distribution of the candidate velocities includes:
determining how many of the plurality of candidate velocities belong to each of a multiplicity of bins, each bin corresponding to a respective range;
selecting, from the multiplicity of bins, a subset of one or more bins to which more than a threshold number of candidate velocities belong; and
determining the velocity of the object using the selected subset.

12. The method of claim 11, wherein:
when only one bin in the multiplicity of bins has a count of candidate velocities above the threshold number, the method further comprises:
computing the velocity of the object by averaging the candidate velocities within the one bin.

13. The method of claim 11, wherein:
when two or more adjacent bins in the multiplicity of bins have counts above the threshold, the method further comprises:
computing the velocity of the object by averaging the candidate velocities within the two or more adjacent bins.

14. The method of claim 10, wherein determining the mode in the distribution of the candidate velocities comprises clustering the candidate velocities.

15. The method of claim 1, further comprising:
identifying a first mode and a second mode in the distribution of the candidate velocities; and
computing the velocity of the object and a rotational velocity of the object based at least in part on the first mode and the second mode.

16. The method of claim 1, further comprising:
identifying a first mode and a second mode in the distribution of the candidate velocities; and
determining, in response to the first and second mode differing by greater than a particular threshold amount, that the object includes two separate objects.

17. An imaging system configured to:
generate, by one or more processors, a first set of features of the object and a second set of features of the object using data collected by the imaging sensor during a first time interval and a second time interval, respectively, wherein generating a feature in the first set or second set of features includes detecting a center of a line segment formed by consecutive points in a scan line to identify a flat surface of the object;
compute, by the one or more processors, a plurality of candidate velocities based on differences in spatial positions of features selected pairwise from the first set and the second set; and
compute, by the one or more processors, the velocity of the object based on the distribution of the plurality of candidate velocities.

18. The imaging system of claim 17, wherein the imaging system is a lidar system, and generating the first set of features and the second set of features is based on a first set of scan lines of the lidar and a second set of scan lines of the lidar.

19. The imaging system of claim 18, wherein the lidar system is configured to obtain the first set of scan lines and the second set of scan lines by rescanning at least a portion of a field of regard of the lidar in the course of obtaining a single frame.

20. The imaging system of claim 17, wherein generating a feature in the first set or second set of features further includes:
detecting a discontinuity of positions of points in the scan line to identify an edge of the object.

21. The imaging system of claim 17, wherein:
generating the first set of features and the second set of features further includes determining a type of each of the features; and
computing the plurality of the candidate velocities includes restricting the pairwise comparisons to the features of the same type.

* * * * *